(12) United States Patent
Nishio

(10) Patent No.: US 8,031,254 B2
(45) Date of Patent: Oct. 4, 2011

(54) OPTICAL DEVICE, IMAGING DEVICE, CONTROL METHOD FOR OPTICAL DEVICE, AND PROGRAM

(75) Inventor: Akihiro Nishio, Yokohama (JP)

(73) Assignee: Canon Kabushiki Kaisha (JP)

( * ) Notice: Subject to any disclaimer, the term of this patent is extended or adjusted under 35 U.S.C. 154(b) by 635 days.

(21) Appl. No.: 11/942,578

(22) Filed: Nov. 19, 2007

(65) Prior Publication Data
US 2008/0117326 A1  May 22, 2008

(30) Foreign Application Priority Data
Nov. 22, 2006  (JP) .................. 2006-316117

(51) Int. Cl.
*H04N 5/225* (2006.01)
(52) U.S. Cl. ........................................ 348/335
(58) Field of Classification Search .......... 348/335, 348/347, 360, 211.11, 220
See application file for complete search history.

(56) References Cited

U.S. PATENT DOCUMENTS

| | | | |
|---|---|---|---|
| 6,335,758 B1 * | 1/2002 | Ochi et al. | 348/335 |
| 6,734,911 B1 * | 5/2004 | Lyons | 348/340 |
| 7,071,971 B2 * | 7/2006 | Elberbaum | 348/211.11 |
| 2003/0160886 A1 * | 8/2003 | Misawa et al. | 348/347 |
| 2004/0100563 A1 * | 5/2004 | Sablak et al. | 348/211.4 |

FOREIGN PATENT DOCUMENTS

| | | |
|---|---|---|
| JP | 09-297350 A | 11/1997 |
| JP | 2003-009104 A | 1/2003 |
| JP | 2006-081089 A | 3/2006 |
| JP | 2006-139234 A | 6/2006 |

* cited by examiner

*Primary Examiner* — David Ometz
*Assistant Examiner* — Akshay Trehan
(74) *Attorney, Agent, or Firm* — Rossi, Kimms & McDowell LLP

(57) ABSTRACT

An optical device which allows size and cost reductions and enables simultaneous capture of images taken by a first optical system and images taken by a composite optical system composed of the first optical system and a second optical system. A first optical system is adapted to form a first image. A second optical system is disposed on a subject side of the first optical system, and is adapted to form a second image within the first image formed by the first optical system.

15 Claims, 24 Drawing Sheets

(P) SECOND OPTICAL SYSTEM PANNING DIRECTION

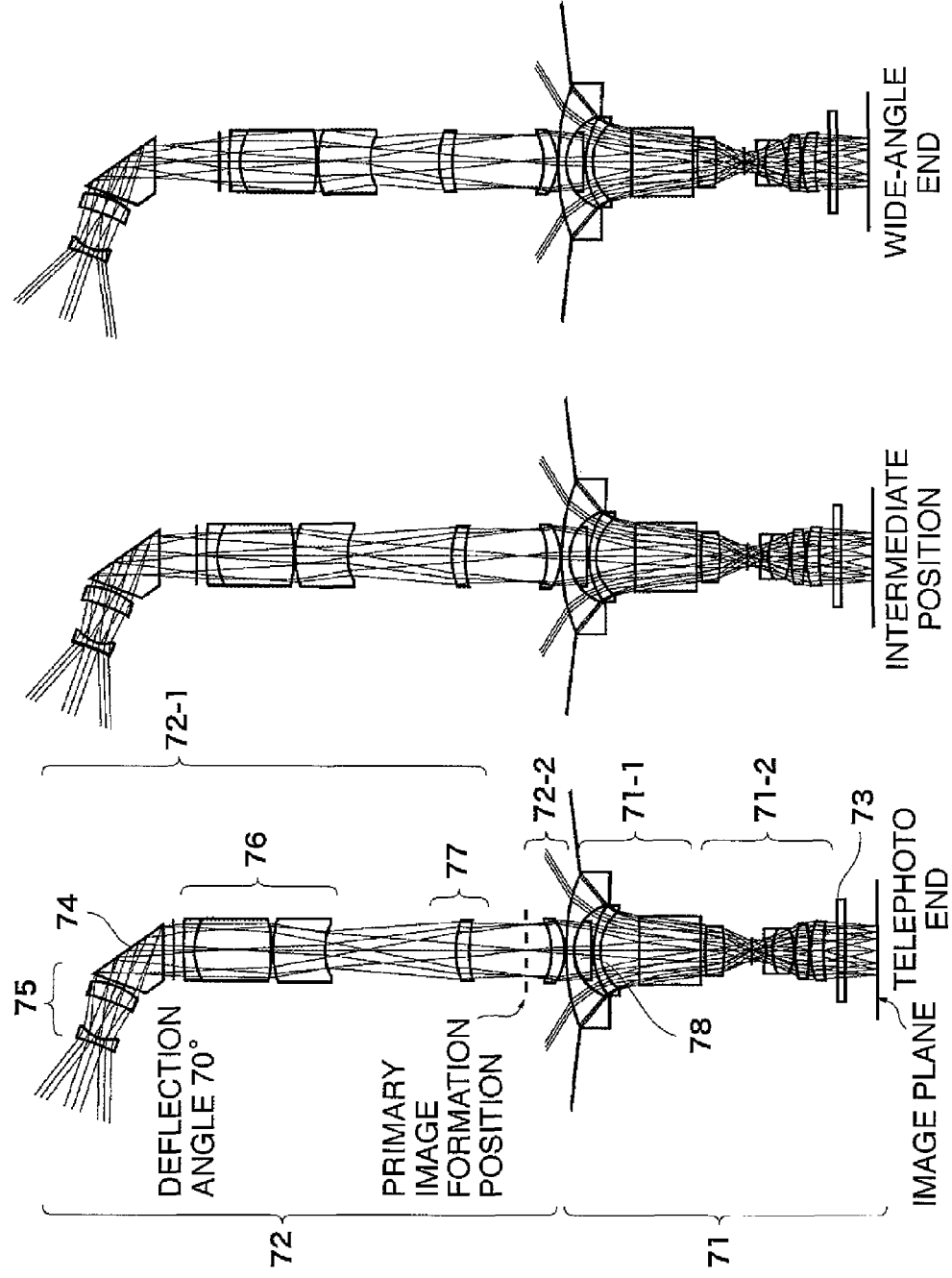

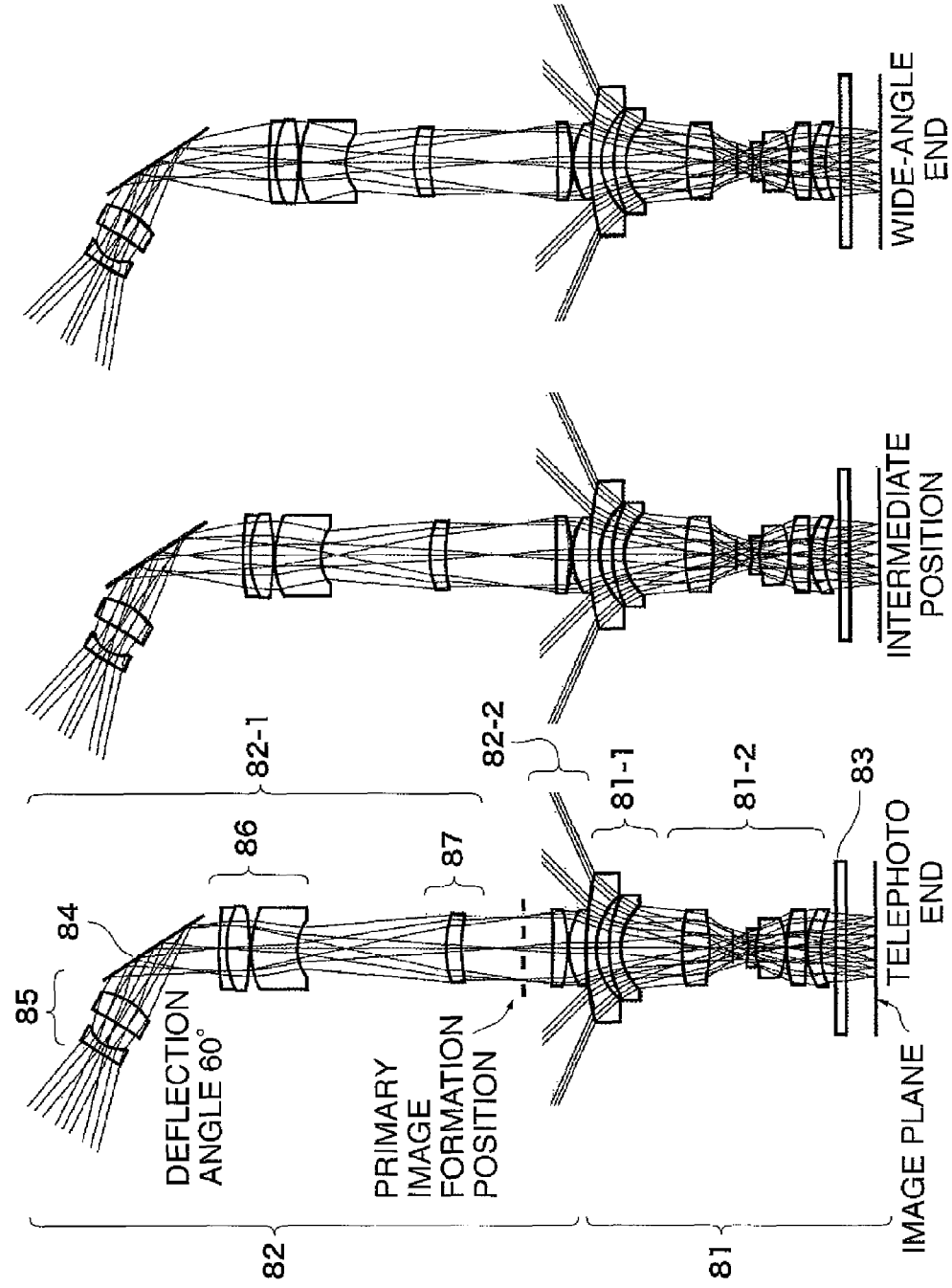

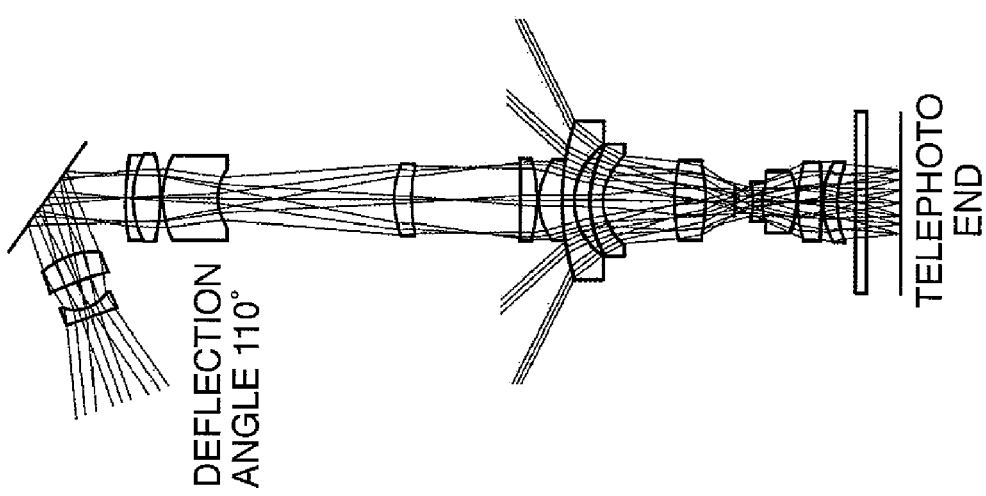
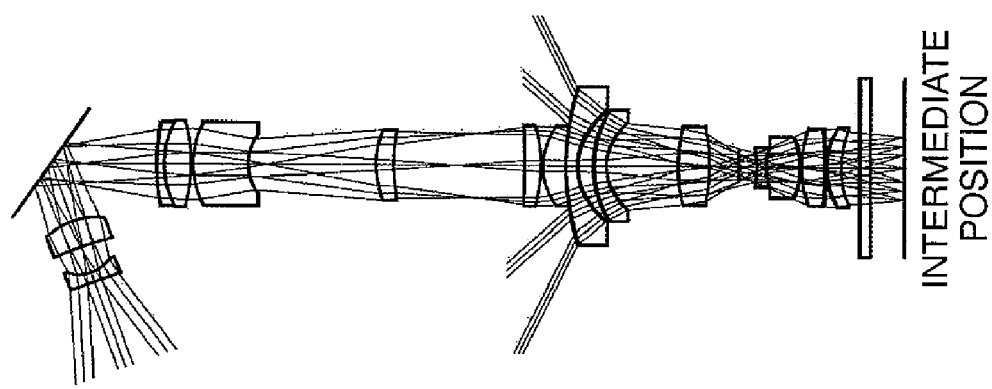
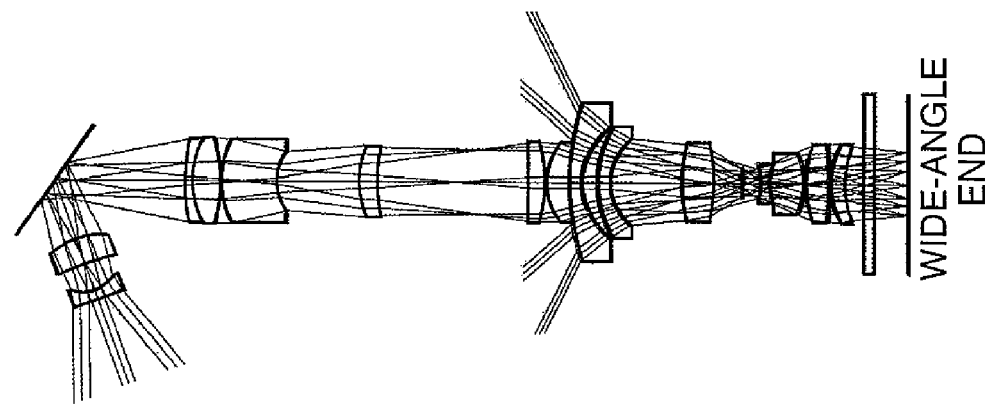

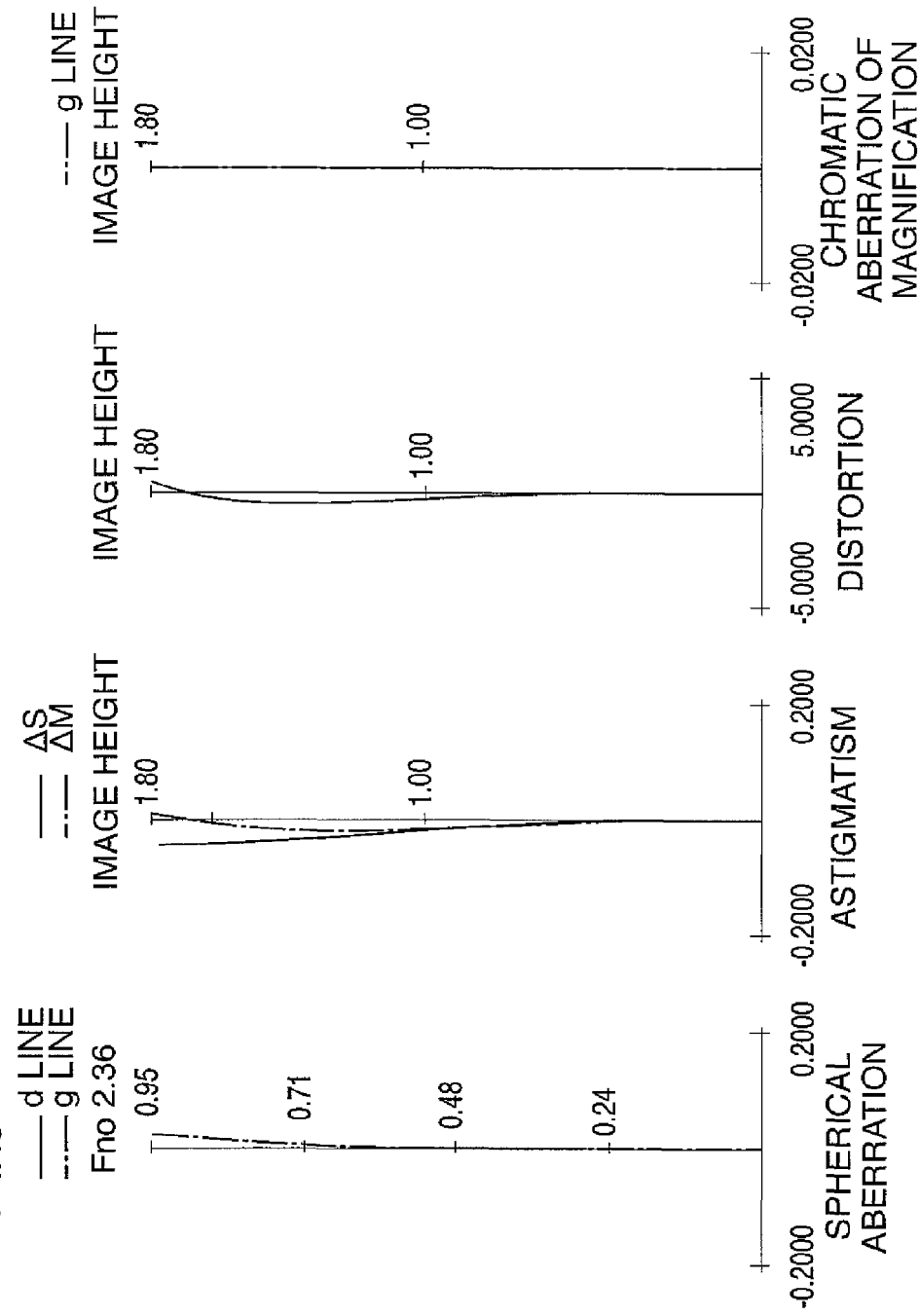

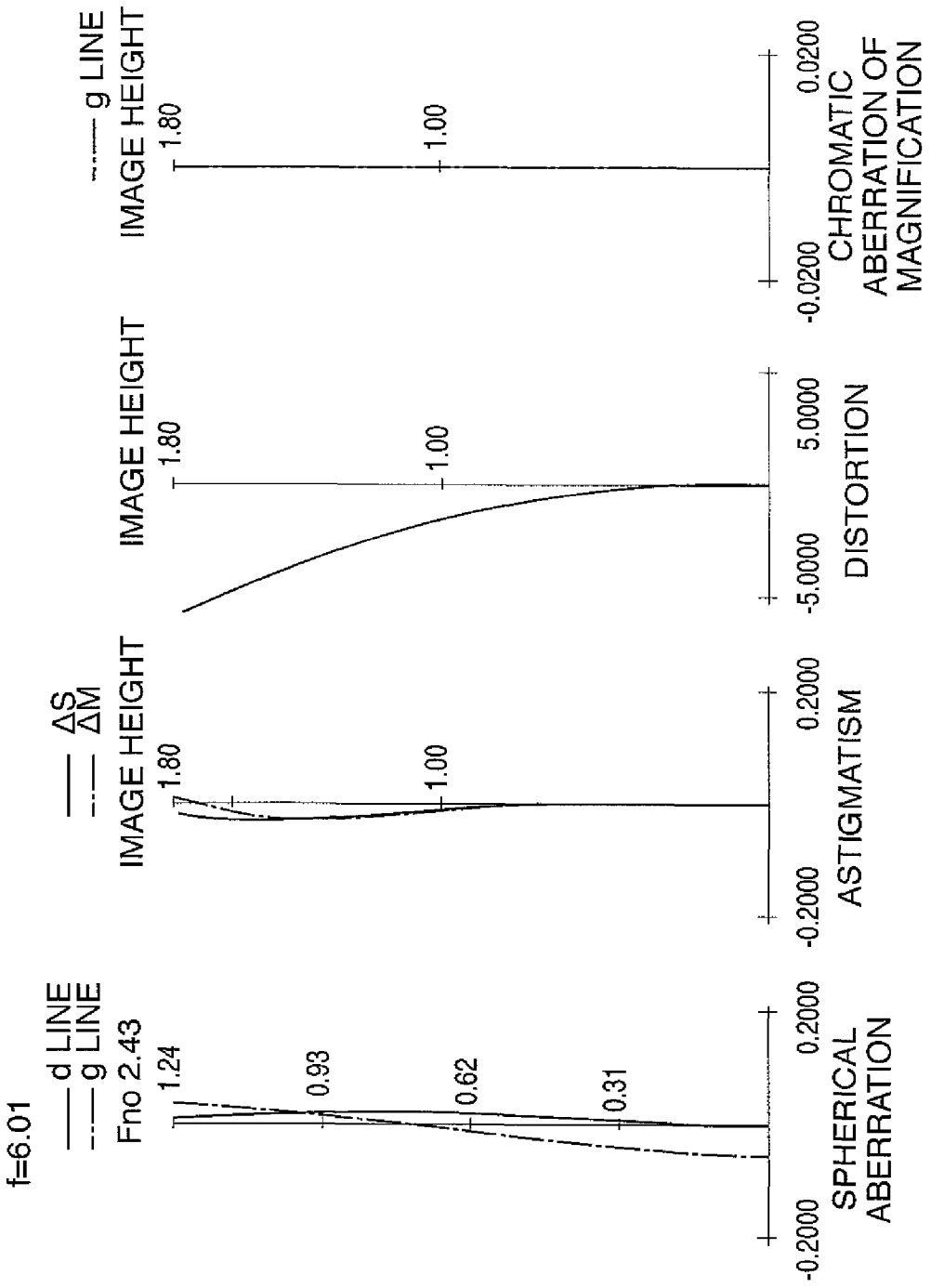

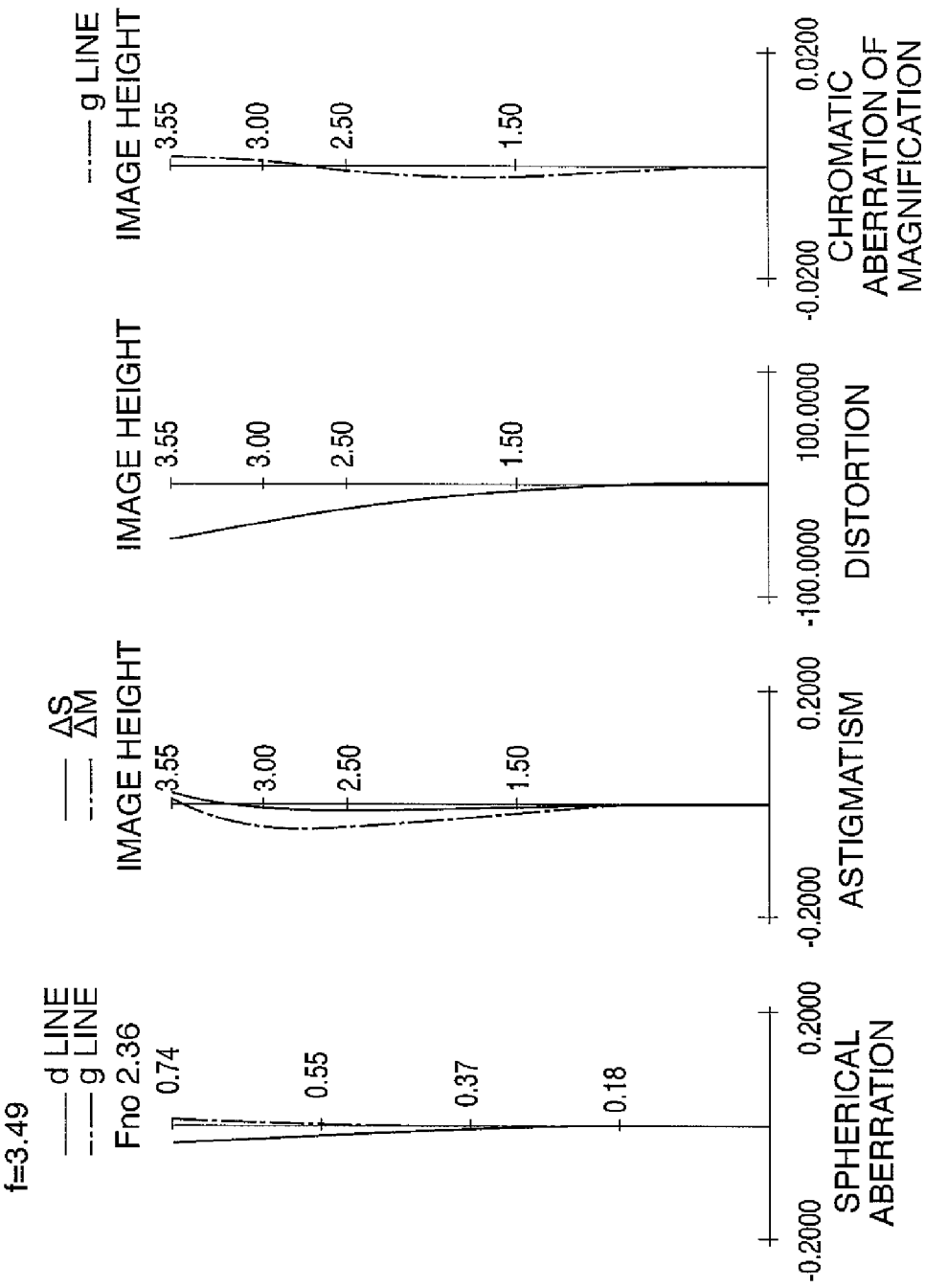

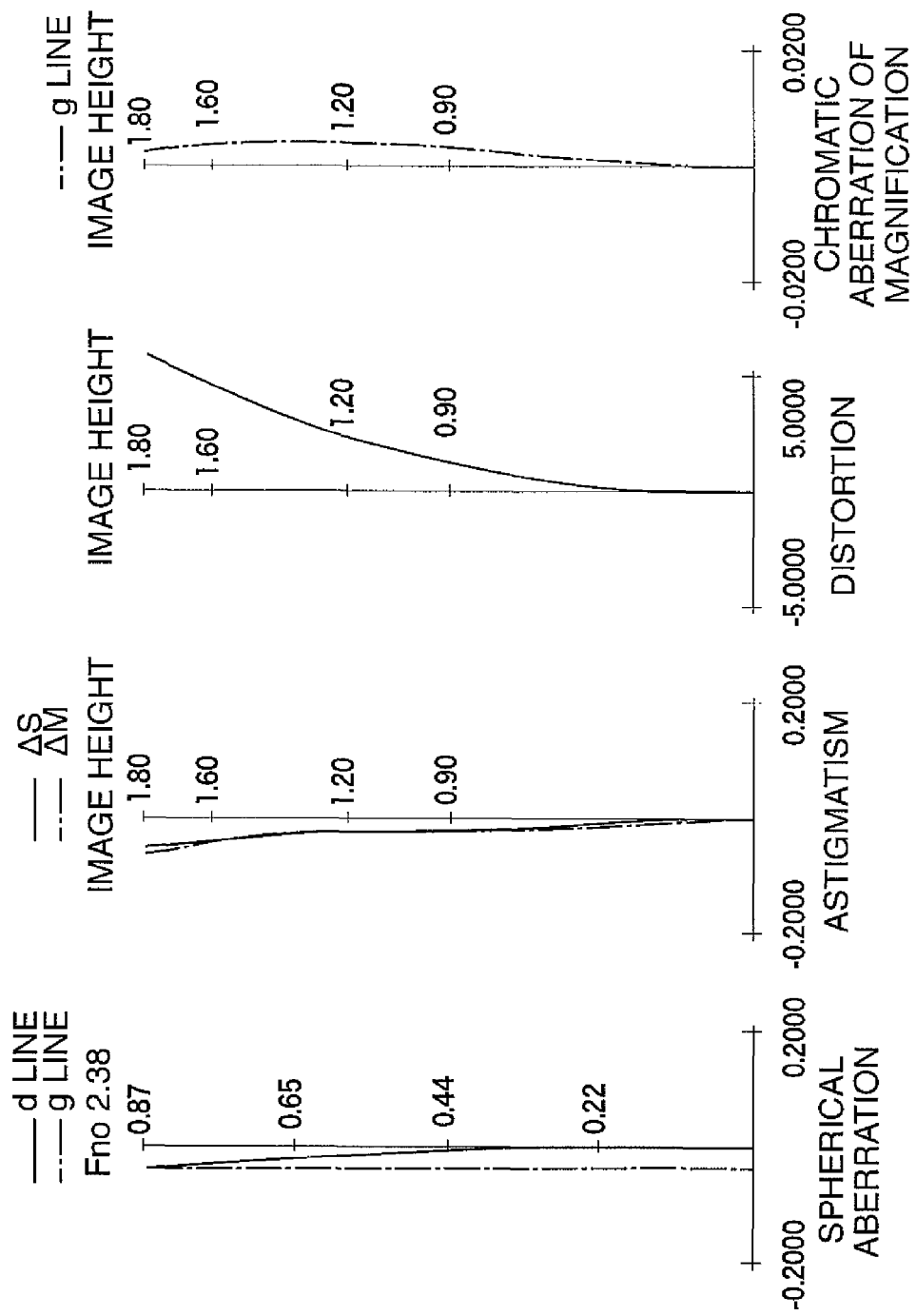

FIG. 19A

FIRST OPTICAL SYSTEM : f=2.86 Fno=2.40 2ω=175.0°
COMPOSITE OPTICAL SYSTEM INCLUDING
FIRST AND SECOND OPTICAL SYSTEMS : f=4.48 Fno=2.36 2ω=43.8°

| | | | |
|---|---|---|---|
| R 1= -45.632 | D 1= 1.20 | N 1= 1.84666 | ν 1= 23.9 |
| R 2= 7.060 | D 2= 3.80 | | |
| *R 3= 508.102 | D 3= 3.22 | N 2= 1.80518 | ν 2= 25.5 |
| *R 4= -14.393 | D 4= 0.50 | | |
| R 5= ∞ | D 5= 13.00 | N 3= 1.80518 | ν 3= 25.4 |
| R 6= ∞ | D 6= 1.50 | | |
| R 7= ∞ | D 7= 1.50 | | |
| R 8= 58.413 | D 8= 1.00 | N 4= 1.75520 | ν 4= 27.5 |
| R 9= 12.334 | D 9= 3.27 | N 5= 1.69680 | ν 5= 55.5 |
| R10= -21.285 | D10= 0.15 | | |
| R11= 12.537 | D11= 7.17 | N 6= 1.67003 | ν 6= 47.2 |
| R12= 7.947 | D12=22.26 | | |
| R13= 11.500 | D13= 2.50 | N 7= 1.69680 | ν 7= 55.5 |
| R14= 17.000 | D14=12.00 | | |
| R15= 31.114 | D15= 3.00 | N 8= 1.77250 | ν 8= 49.6 |
| R16= -26.839 | D16= 0.15 | | |
| R17= 36.072 | D17= 2.50 | N 9= 1.77250 | ν 9= 49.6 |
| R18= -39.334 | D18= 0.15 | | |

SECOND OPTICAL SYSTEM

FIG. 19B

| | | | | |
|---|---|---|---|---|
| R19= 30.000 | D19= 1.30 | N10=1.88300 | ν10= 40.8 | |
| R20= 7.046 | D20= 2.84 | | | |
| R21= 10.929 | D21= 1.00 | N11=1.88300 | ν11= 40.8 | |
| R22= 7.395 | D22= 5.65 | | | |
| R23= -347.892 | D23= 9.07 | N12=1.80518 | ν12= 25.4 | |
| R24= 275.967 | D24= 0.50 | | | |
| R25= 24.522 | D25= 3.00 | N13=1.80518 | ν13= 25.4 | |
| R26= -16.746 | D26= 4.05 | | | |
| R27= APERTURE | D27= 2.00 | | | FIRST OPTICAL SYSTEM |
| R28= -5.565 | D28= 1.00 | N14=1.84666 | ν14= 23.9 | |
| R29= 8.000 | D29= 3.20 | N15=1.77250 | ν15= 49.6 | |
| R30= -7.892 | D30= 0.20 | | | |
| R31= 14.623 | D31= 2.00 | N16=1.60311 | ν16= 60.6 | |
| R32= -26.141 | D32= 0.12 | | | |
| R33= 10.291 | D33= 2.00 | N17=1.83481 | ν17= 42.7 | |
| R34= 23.233 | D34= 2.00 | | | |
| R35= ∞ | D35= 1.20 | N18=1.51633 | ν18= 64.1 | |
| R36= ∞ | | | | |

FIG. 19C

ASPHERICAL SURFACE COEFFICIENTS

| | |
|---|---|
| THIRD SURFACE: | K=-2.34118e+000  A=0.00000e+000  B=2.42125e-004 |
| | C=3.75770e+006  D=-1.03416e+007  E=0.00000e-000 |
| FOURTH SURFACE: | K=-2.45992e+000  A=0.00000e+000  B=2.47862e-005 |
| | C=-7.49131e+007  D=1.038542e-009  E=0.00000e-000 |

FIG. 20A

FIRST OPTICAL SYSTEM : f=2.86 Fno=2.40 2ω=175.0°
(*OPTICAL MEMBER N10 IS NON-TRANSPARENT TO LIGHT RAYS IN THE FIRST OPTICAL SYSTEM)
SECOND COMPOSITE OPTICAL SYSTEM : f=6.01 Fno=2.43 2ω=33.4°

| | | | | |
|---|---|---|---|---|
| R 1= -11.284 | D 1= 1.20 | N 1= 1.84666 | ν 1= 23.9 | |
| R 2= 9.463 | D 2= 2.90 | | | |
| *R 3= -16.564 | D 3= 3.80 | N 2= 1.80518 | ν 2= 25.5 | |
| *R 4= -10.468 | D 4= 0.50 | | | |
| R 5= ∞ | D 5= 10.00 | N 3= 1.80518 | ν 3= 25.4 | |
| R 6= ∞ | D 6= 1.50 | | | |
| R 7= FIXED APERTURE | D 7= 1.50 | | | SECOND OPTICAL SYSTEM |
| R 8= 122.843 | D 8= 1.00 | N 4= 1.75520 | ν 4= 27.5 | |
| R 9= 14.298 | D 9= 5.97 | N 5= 1.69680 | ν 5= 55.5 | |
| R10= -15.988 | D10= 0.15 | | | |
| R11= 11.708 | D11= 9.89 | N 6= 1.67003 | ν 6= 47.2 | |
| R12= 6.495 | D12=19.42 | | | |
| R13= 11.500 | D13= 2.00 | N 7= 1.69680 | ν 7= 55.5 | |
| R14= 17.000 | D14=12.00 | | | |
| R15= -26.625 | D15= 2.00 | N 8= 1.77250 | ν 8= 49.6 | |
| R16= -13.992 | D16= 0.15 | | | |

FIG. 20B

| | | | | |
|---|---|---|---|---|
| R17= 30.000 | D17= 1.30 | N 9=1.88300 | ν 9= 40.8 | |
| R18= 7.046 | D18= 2.50 | *N10=1.88300 | ν10= 40.8 | |
| R19= ∞ | D19= 0.34 | | | |
| R20= 10.929 | D20= 1.00 | N11=1.88300 | ν11= 40.8 | |
| R21= 7.395 | D21= 5.65 | | | |
| R22= -347.892 | D22= 9.07 | N12=1.80518 | ν12= 25.4 | |
| R23= 275.967 | D23= 0.50 | | | |
| R24= 24.522 | D24= 3.00 | N13=1.80518 | ν13= 25.4 | FIRST OPTICAL SYSTEM |
| R25= -16.746 | D25= 4.05 | | | |
| R26= APERTURE | D26= 2.00 | | | |
| R27= -5.565 | D27= 1.00 | N14=1.84666 | ν14= 23.9 | |
| R28= 8.000 | D28= 3.20 | N15=1.77250 | ν15= 49.6 | |
| R29= -7.892 | D29= 0.20 | | | |
| R30= 14.623 | D30= 2.00 | N16=1.60311 | ν16= 60.6 | |
| R31= -26.141 | D31= 0.12 | | | |
| R32= 10.291 | D32= 2.00 | N17=1.83481 | ν17= 42.7 | |
| R33= 23.233 | D33= 2.00 | | | |
| R34= ∞ | D34= 1.20 | N18=1.51633 | ν18= 64.1 | |
| R35= ∞ | | | | |

FIG. 20C

ASPHERICAL SURFACE COEFFICIENTS

| THIRD SURFACE: | K=-2.44808e+000 A=0.00000e+000 B=3.30002e-004 |
| --- | --- |
| | C=5.19991e+006 D=-1.45257e+007 E=0.00000e-000 |
| FOURTH SURFACE: | K=-2.25409e+000 A=0.00000e+000 B=2.47862e-005 |
| | C=-7.49131e+007 D=1.038542e-009 E=0.00000e-000 |

FIG. 21A

FIRST OPTICAL SYSTEM : f=3.49 Fno=2.36 2ω=123.5°

COMPOSITE OPTICAL SYSTEM INCLUDING
FIRST AND SECOND OPTICAL SYSTEMS :
f=5.82~4.16 Fno=2.37 2ω=34.4°~46.8°

| | | | |
|---|---|---|---|
| R 1= 20.191 | D 1= 1.20 | N 1= 1.84666 | ν 1= 23.9 |
| R 2= 4.234 | D 2= 2.97 | | |
| *R 3= -29.952 | D 3= 2.91 | N 2= 1.80518 | ν 2= 25.5 |
| *R 4= -9.587 | D 4= VARIABLE | | |
| R 5= 28.944 | D 5= 0.80 | N 3= 1.75520 | ν 3= 27.5 |
| R 6= 9.363 | D 6= 3.08 | N 4= 1.69680 | ν 4= 55.5 |
| R 7= -21.327 | D 7= 0.15 | | |
| R 8= 9.661 | D 8= 6.03 | N 5= 1.60311 | ν 5= 60.6 |
| R 9= 5.309 | D 9= VARIABLE | | |
| R10= 11.500 | D10= 2.00 | N 6= 1.69680 | ν 6= 55.5 |
| R11= 17.000 | D11=VARIABLE | | |
| R12=-135.656 | D12= 1.80 | N 7= 1.69680 | ν 7= 55.5 |
| R13= -16.843 | D13= 0.15 | | |
| R14= 7.033 | D14= 2.50 | N 8= 1.69680 | ν 8= 55.5 |

SECOND OPTICAL SYSTEM

FIG. 21B

| | | | | |
|---|---|---|---|---|
| R15= 30.000 | D15= 1.30 | N 9=1.88300 | ν 9= 40.8 | |
| R16= 7.702 | D16= 1.66 | | | |
| R17= 77.713 | D17= 1.50 | N10=1.88300 | ν10= 40.8 | |
| R18= 6.262 | D18= 7.89 | | | |
| R19= 15.854 | D19= 3.58 | N11=1.80518 | ν11= 25.4 | |
| R20= -16.956 | D20= 3.05 | | | |
| R21= ∞ | D21= 2.00 | | | FIRST OPTICAL SYSTEM |
| R22= -6.384 | D22= 1.00 | N12=1.84666 | ν12= 23.9 | |
| R23= 5.468 | D23= 3.89 | N13=1.77250 | ν13= 49.6 | |
| R24= APERTURE | D24= 0.20 | | | |
| R25= 12.050 | D25= 2.50 | N14=1.60311 | ν14= 60.6 | |
| R26= -61.265 | D26= 0.12 | | | |
| R27= 7.950 | D27= 1.80 | N15=1.83481 | ν15= 42.7 | |
| R28= 10.568 | D28= 2.00 | | | |
| R29= ∞ | D29= 1.20 | N15=1.51633 | ν15= 64.1 | |
| R30= ∞ | | | | |

FIG. 21C

| VARIABLE INTERVAL \ FOCAL POINT DISTANCE | 5.82 | 4.88 | 4.16 |
|---|---|---|---|
| D4 | 15.50 | 18.44 | 21.31 |
| D9 | 19.42 | 14.06 | 9.01 |
| D11 | 12.00 | 14.42 | 16.54 |

FIG. 21D

ASPHERICAL SURFACE COEFFICIENTS

| THIRD SURFACE: | K=7.13877e+000  A=0.00000e+000  B=-2.50598e-005 |
| --- | --- |
| | C=5.26468e+005  D=-1.72872e+006  E=0.00000e-000 |
| FOURTH SURFACE: | K=1.09256e+000  A=0.00000e+000  B=-2.47862e-005 |
| | C=-7.49131e+007  D=1.038542e-009  E=0.00000e-000 |

OPTICAL DEVICE, IMAGING DEVICE, CONTROL METHOD FOR OPTICAL DEVICE, AND PROGRAM

BACKGROUND OF THE INVENTION

1. Field of the Invention

The present invention relates to an optical device, an imaging device, a control method for the optical device, and a program applied to realize an imaging optical system suitable for an apparatus such as a monitoring-use digital camera or video camera.

2. Description of the Related Art

Conventionally, to find the subject (imaging target) and obtain a detailed image, it is normal to use a method in which a very wide-angle lens or fish-eye lens is used to image a wide field of view and the detailed image is obtained after distinguishing the target subject in the field of view.

The following is an example of the type of method used to acquire an image of such a subject.

(1) Method to obtain enlarged image of target subject using an electronic zoom.
(2) Method to obtain image of target subject by constructing an optical system as a zoom lens and changing the magnification of the optical system (zoom lens) at the telephoto end.
(3) Method in which a plurality of imaging systems are used, one being a wide angle imaging system and the other being a zoom imaging system, and the acquired image of the target subject is switched between the systems.

In another proposed method, the subject light directed to the imaging element is switched by driving a reflective member provided in the optical system (see, for instance, Japanese Laid-Open Patent Publication (Kokai) No. H9-297350, Japanese Laid-Open Patent Publication (Kokai) No. 2003-9104, and Japanese Laid-Open Patent Publication (Kokai) No. 2006-81089).

In a further proposed method, a reflected image in a peripheral part of a convex reflective member is used to observe the entire surroundings of the subject, and with the central part of the reflective member having a transparent construction, another image is observed using a separate optical system (see, for instance, Japanese Laid-Open Patent Publication (Kokai) No. 2006-139234).

However, the above-described conventional image acquiring methods have the following problems.

In the method of (1), to obtain the enlarged image of the target subject by extracting a part of the image, it is necessary to use an imaging element having a high number of pixels to obtain a highly detailed image, and the performance requirements for the imaging optical system are more stringent. This causes costs to increase.

In the method of (2), when the target subject is a moving body and the photographer sees the subject during zooming, it is necessary zoom out to a wide-angle image in order to follow the subject. It is not therefore possible to speedily observe of the subject. Moreover, it is difficult to realize an optical system which includes both wide-angle and telephoto functions.

In the method of (3), since a plurality of optical system are used, a plurality of camera units must be used. Hence, the size and cost of the imaging device increase.

In the method of (3) described above, in order to obtain characteristics resembling the characteristics seen when a plurality of imaging optical systems are used by switching a part of an imaging optical system using a single imaging element, a mechanism is typically required to insert/withdraw the part of the imaging optical system within the system. Conventionally, mechanisms for switching a part of an imaging optical system have been widely used in dual-focus type silver halide compact cameras. However, there is a problem in that inclusion of the mechanism to switch the part of the optical system complicates the construction.

In a further method, light is directed onto the imaging medium by combining a plurality of subject images using a half-transmitting reflective member capable of both transmitting and reflecting light. However, with this method there is a problem in that images darken due to the reduction in transmissivity, and in that the image is built up from a plurality of subject images, making it difficult to observe the target image separately.

Further, the technologies disclosed in Japanese Laid-Open Patent Publication (Kokai) No. H9-297350, Japanese Laid-Open Patent Publication (Kokai) No. 2003-9104, and Japanese Laid-Open Patent Publication (Kokai) No. 2006-81089 have a construction which makes it difficult to implement large changes in imaging angle. Further, large changes in the direction of the target subject that is being imaged tend to occur. As a result, it is difficult to detect the target subject and acquire detailed information in a short time period.

Moreover, the technology disclosed in Japanese Laid-Open Patent Publication (Kokai) No. 2006-139234 has the problem that it is difficult and costly to manufacture a large reflective member with a favorable profile irregularity. Moreover, in Japanese Laid-Open Patent Publication (Kokai) No. 2006-139234, since the data values for implementing the optical construction is not disclosed, it is unclear if the device can be realized.

SUMMARY OF THE INVENTION

The present invention provides an optical device, an imaging device, a control method for the optical device, and a program which allow size and cost reductions and enable simultaneous capture of images taken by a first optical system and images taken by a composite optical system composed of the first optical system and a second optical system.

In a first aspect of the present invention, there is provided an optical device for use in imaging, comprising: a first optical system adapted to form a first image; and a second optical system disposed on a subject side of the first optical system, and adapted to form a second image within the first image formed by the first optical system.

The first optical system can include an optical member having an outer diameter that is larger than an outer diameter of an optical member of the second optical system, and having a refractive function for forming the first image outside the second image formed by the second optical system.

The first optical system can includes an optical member being arranged on an optical axis of the second optical system, and having a refractive function for forming the first image outside the second image formed by the second optical system.

The first optical system can have an angle of view of at least 90° and functions as a wide-angle lens or a fish-eye lens.

The second optical system may not entirely block light rays incident on the first optical system.

The second optical system can have an outer lens diameter which allows transmission of at least a portion of off-axis light rays.

The second optical system can include a reflective member for deflecting light rays incident on the second optical system toward the first optical system.

The reflective member can rotate around an optical axis of the first optical system.

The reflective member can rotate around an optical axis of the first optical system, together with an optical system disposed on a subject side in the second optical system.

The second optical system can perform an primary image formation on the subject side of the first optical system, and the first optical system can perform a secondary image formation to the first image formation.

A positive lens group of the second optical system can be disposed on an image plane side of a position where the primary image formation is performed, and the first optical system can be disposed on the image plane side of the positive lens group.

The first optical system can include an optical member adapted to transmit only light rays passing through the second optical system.

In a second aspect of the present invention, there is provided an imaging device including the optical device, comprising: an imaging unit adapted to photo-electronically convert a subject image formed by the optical device to electronic signals; a panning mechanism adapted to drive the optical device in a panning direction; and a tilting mechanism adapted to drive the optical device in a tilting direction.

In a third aspect of the present invention, there is provided a control method for an optical device including a first optical system adapted to form a first image; and a second optical system disposed on a subject side of the first optical system, and adapted to form a second image within the first image formed by the first optical system, the optical device being adapted to be driven in a panning direction and a tilting direction, the control method comprising: a detecting step of recognizing a target subject from an image formed by the first optical system, and detecting a relative position of the target subject with respect to the optical device; a calculating step of calculating necessary driving angles in the panning direction and the tilting direction of the optical device based on the detected relative position of the target subject with respect to the optical device; and a driving step of driving the optical device in the panning direction and tilting direction when the calculated necessary driving angles are greater than or equal to prescribed values.

In a fourth aspect of the present invention, there is provided a program for causing a computer to execute the control method of the optical device.

According to the present invention, a second optical system is provided so that light which has been transmitted through the first optical system passes through the second optical system to form another captured image within the formed image range. This makes it possible to realize a small-sized, reduced cost optical device which enables simultaneous capture of images taken by a first optical system and images taken by a composite optical system composed of the first optical system and a second optical system.

The above and other objects, features, and advantages of the invention will become more apparent from the following detailed description taken in conjunction with the accompanying drawings.

BRIEF DESCRIPTION OF THE DRAWINGS

FIGS. 7A to 7C are views of light paths in the first optical system and the second optical system of the optical device of a second numerical example.

FIGS. 8A to 8C are views of light paths in the first optical system and the second optical system of the optical device in a third numerical example when an deflection angle of the second optical system is 60°.

FIGS. 9A to 9C are views of light paths in the first optical system and the second optical system of the optical device of a third numerical example when the deflection angle of the second optical system is 110°.

FIGS. 13A to 13D are views of aberrations in the composite optical system composed of the first optical system and the second optical system of the optical device in the first numerical example.

FIGS. 14A to 14D are views of aberrations in the composite optical system composed of the first optical system and the second optical system of the optical device in the second numerical example.

FIGS. 15A to 15D are views of aberrations in the first optical system of the optical device in the third numerical example.

FIGS. 18A to 18D are views of aberrations at a wide-angle end of the composite optical system composed of the first optical system and the second optical system of the optical device in the third numerical example.

FIGS. 19A to 19C are tables of specific values of the first numerical example.

FIGS. 20A to 20C are tables of specific values of the second numerical example.

FIGS. 21A to 21D are tables of specific values of the third numerical example.

DETAILED DESCRIPTION OF THE PREFERRED EMBODIMENTS

The present invention will now be described in detail with reference to the drawings showing preferred embodiments thereof.

It should be noted that the relative arrangement of the components, the numerical expressions and numerical values set forth in these embodiments do not limit the scope of the present invention unless it is specifically stated otherwise.

Figure 1:
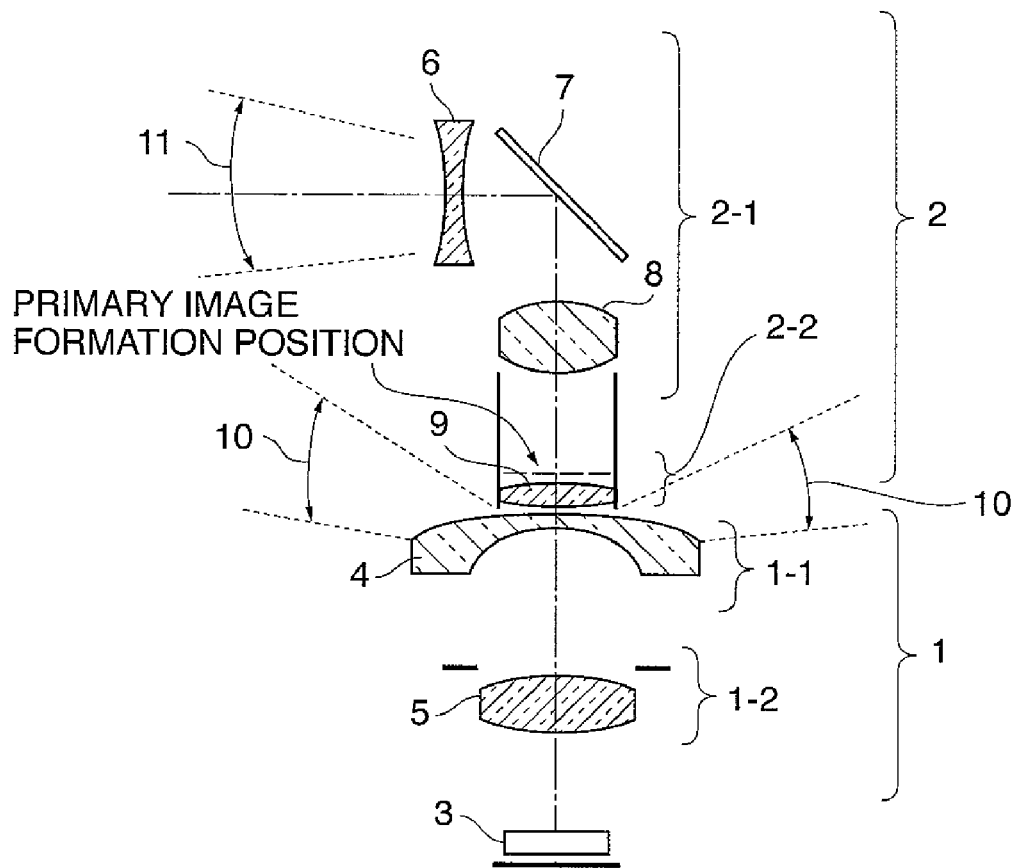
FIG. 1 is a view of the construction of the optical device of an embodiment of the present invention.

FIG. 1 is a view of the construction of an optical device of an embodiment of the present invention.

The optical device in FIG. 1 is constructed from a first optical system 1 and a second optical system 2. The imaging element 3 photo-electronically converts a subject image to an electronic signal, and is provided in a back stage of the first optical system 1. The optical device operates to perform primary image formation of a subject image that has passed through the second optical system 2 on a subject side of the first optical system 1, and then secondary image formation by passing the primary image through the first optical system 1.

In the embodiment of the present invention, the first optical system and the second optical system are essential elements in the optical device, but the imaging element is not an essential element. Further, in the embodiment of the present invention, the imaging device (optical apparatus) includes the optical device as a main component and further includes, installed on the optical device, the imaging element, a panning mechanism, a tilting mechanism and the like.

The first optical system 1 includes a front group A indicated by 1-1 having negative lens group 4 and a back group A indicated by 1-2 having a positive lens group 5. The first optical system 1 is an optical system having a wide-angle angle of view, and is arranged as a retrofocus type optical system including the front group A (negative lens group), indicated by 1-1, with the comparatively large lens diameter, and, on the image plane side, the back group A (positive lens group), indicated by 1-2.

Using the above-described retrofocus type optical system arrangement allows the first optical system 1 to function as a wide angle lens or fish-eye lens, which are refractive optical systems having an angle of view of at least 90°, and thereby allows a wide image range to be obtained. In the drawings, the range indicated by the symbol 10 is the range defining the angle of view of the first optical system 1.

The second optical system 2 includes a front group B, indicated by 2-1, having a negative lens group 6, a reflective member 7, and a positive lens group 8, and a back group B, indicated by 2-2, having a positive lens group 9. The second optical system 2 performs primary image formation on the subject side of the first optical system 1 with an angle of view that is narrower than that of the first optical system 1. The image resulting from the primary image formation is matched with the optical axis of the first optical system 1 at a back focus position equivalent to an image formation position of the first optical system 1, and image formation is performed again (secondary image formation).

Hence, the second optical system 2 is so arranged that the back group B (positive lens group), indicated by 2-2, is disposed between the primary image formation position and the front group A (negative lens group), indicated by 1-1, and has a lens diameter smaller than that of the lens disposed furthest towards the subject side in the front group A. A reflective member 7 is constructed as a reflecting mirror for changing the inclination of the optical axis. By rotationally driving the reflective member 7, it is possible to freely set a deflection angle. In the drawings, the range indicated by the symbol 11 is the range of the angle of view for the second optical system 2.

By equipping the first optical system with lens group 4 which has a refracting function, it is possible to form an image outside the image formed on the image plane by the second optical system.

Also, use of the refracting function of the lens group 4 which has the outer diameter that is larger than the outer diameter of the optical member of the adjacent second optical system on the subject side prevents blocking of the incident light by the second optical system.

In the present embodiment, the second optical system 2, which forms another image inside the image range of the first optical system 1, is disposed on the subject side of the first optical system 1 which, as described above, is a refracting optical system having a wide-angle lens or fish-eye lens function and an angle of view of at least 90°. This allows an imaging optical system capable of simultaneously imaging a wide-angle view and a detailed view with a narrower field than the wide-angle view to be realized.

Figure 2:
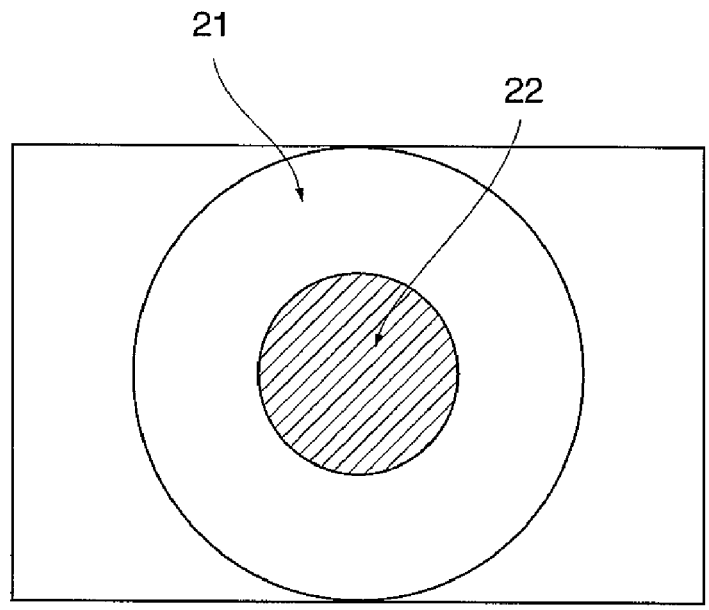
FIG. 2 is a schematic view of a composite image obtained using the first and second optical systems of the optical device.

FIG. 2 is a schematic view of a composite image obtained using the first and second optical systems of the optical device.

In FIG. 2, the subject image with the wide angle of view obtained by the first optical system 1 is formed in an image range 21 corresponding to a peripheral region of an image circle. At the same time, a detailed subject image obtained by the composite optical system (re-imaging optical system) composed of the first optical system 1 and the second optical system 2 is formed in an image range 22 corresponding to the central region of the image circle. Since the second optical system 2 includes the reflective member 7 for inclining the optical axis direction, a part of the subject image within the angle of view of the first optical system 1 can be observed in detail.

Figure 3:
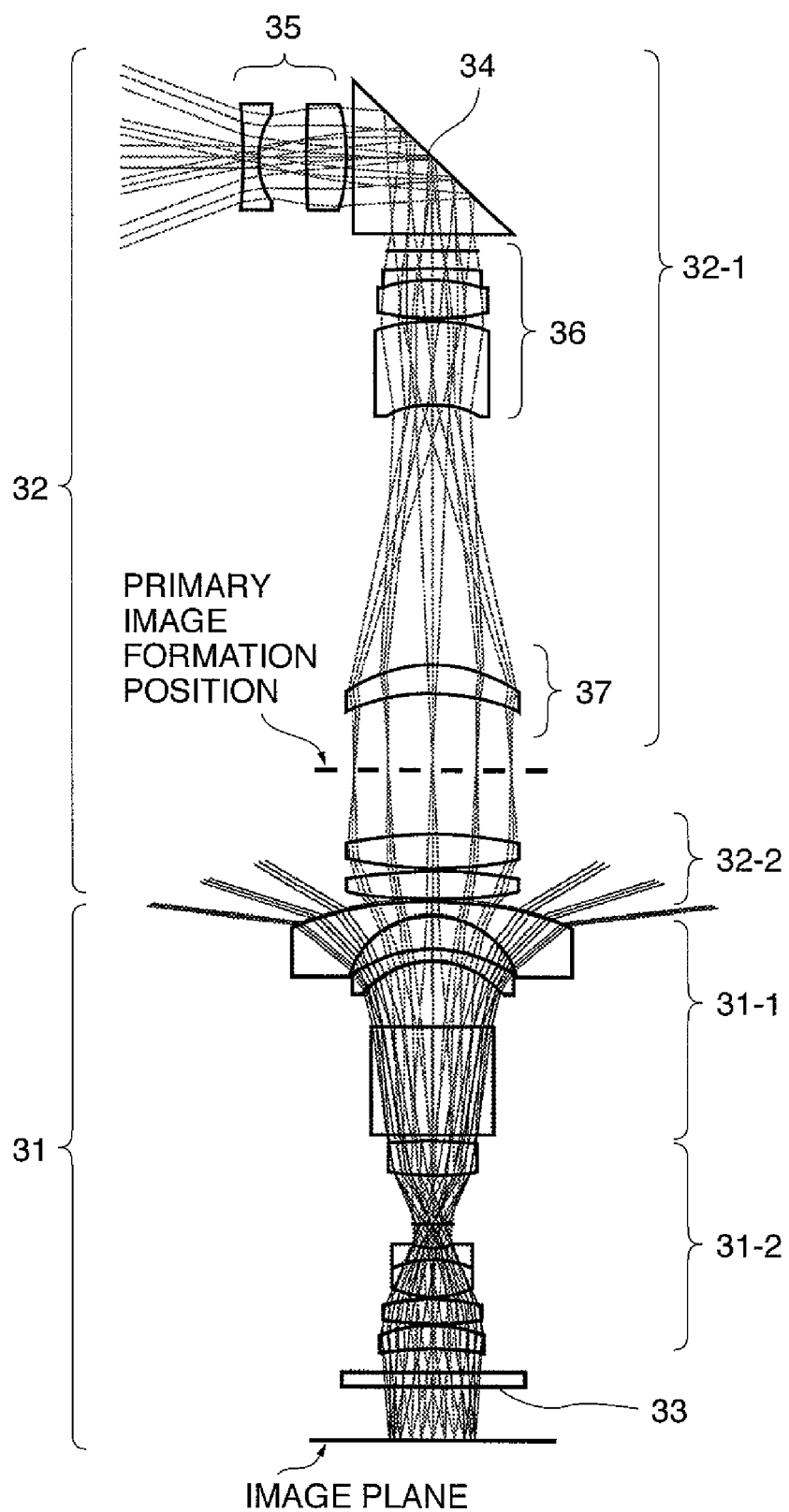
FIG. 3 is a view of light paths in the first optical system and the second optical system of the optical device of a first numerical example.

The following describes a light path diagram in a first numerical example using the optical device of the present embodiment with reference to FIG. 3.

FIG. 3 is a view of light paths in the first optical system and the second optical system of the optical device in a first numerical example.

The optical device in FIG. 3 is constructed from a first optical system 31 and a second optical system 32. The first optical system 31 includes, from the subject side, a front group A, indicated by 31-1, and a back group A, indicated by 31-2. The front group A, indicated by 31-1, has a negative refractive power. The back group A, indicated by 31-2, has a positive refractive power. Filters 33 indicates the infra-red cut and low pass effects and the effects of the cover glass of the imaging element and the like, when light rays that have passed through the back group A, indicated by 31-2, form an image on the image plane of the imaging element.

The second optical system 32 includes, from the subject end, a front group B, indicated by 32-1, and a back group B, indicated by 32-2. The front group B, indicated by 32-1, includes a reflective member (reflecting prism) 34, a B1 group 35 having a negative refractive power, a B2 group 36 having a positive refractive power, a composite optical system composed of the B1 group 35 and the B2 group 36, and a B3 group 37 having a positive refractive power and disposed in proximity to the image formation position. The back group B, indicated by 32-2, includes a lens group having a positive refractive power disposed between the primary image forming position and the first optical system 31. Note that specific values for the first to third numerical examples are described later.

Figure 4:
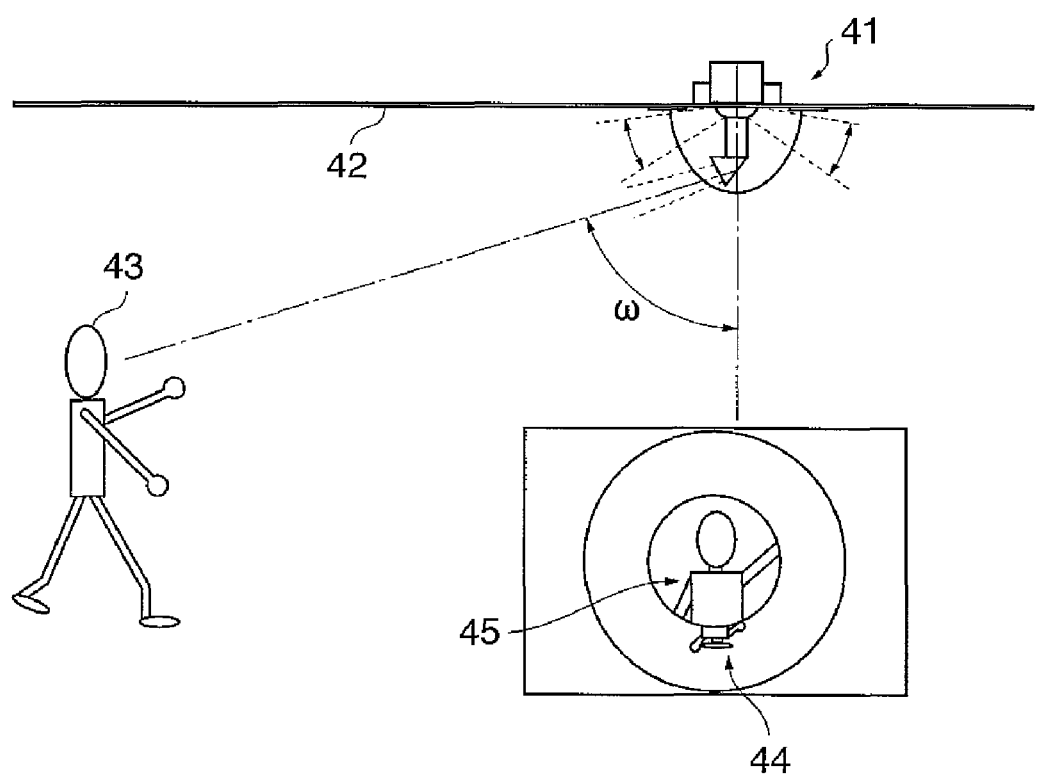
FIG. 4 is a view of an example of the imaging device (optical apparatus) which includes the optical device.
Figure 5:
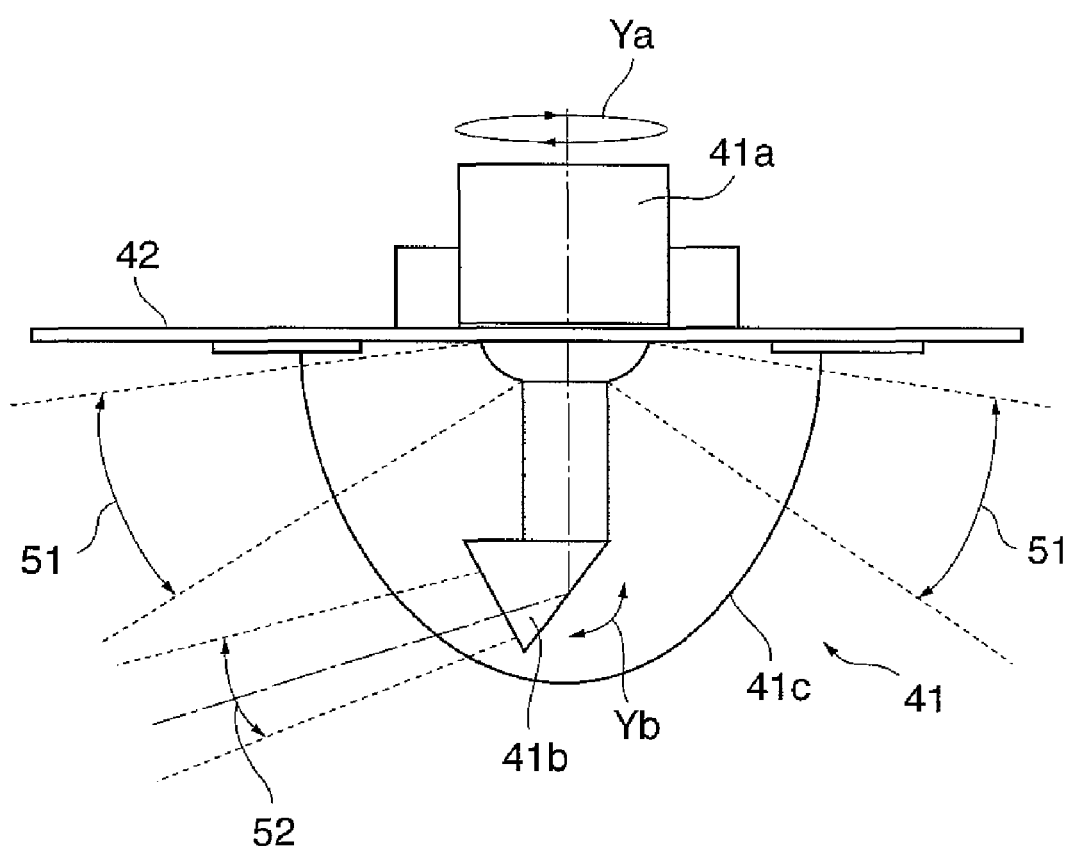
FIG. 5 is a view showing schematically showing a construction of the mechanism of the imaging device (optical apparatus) which includes the optical device.
Figure 6:
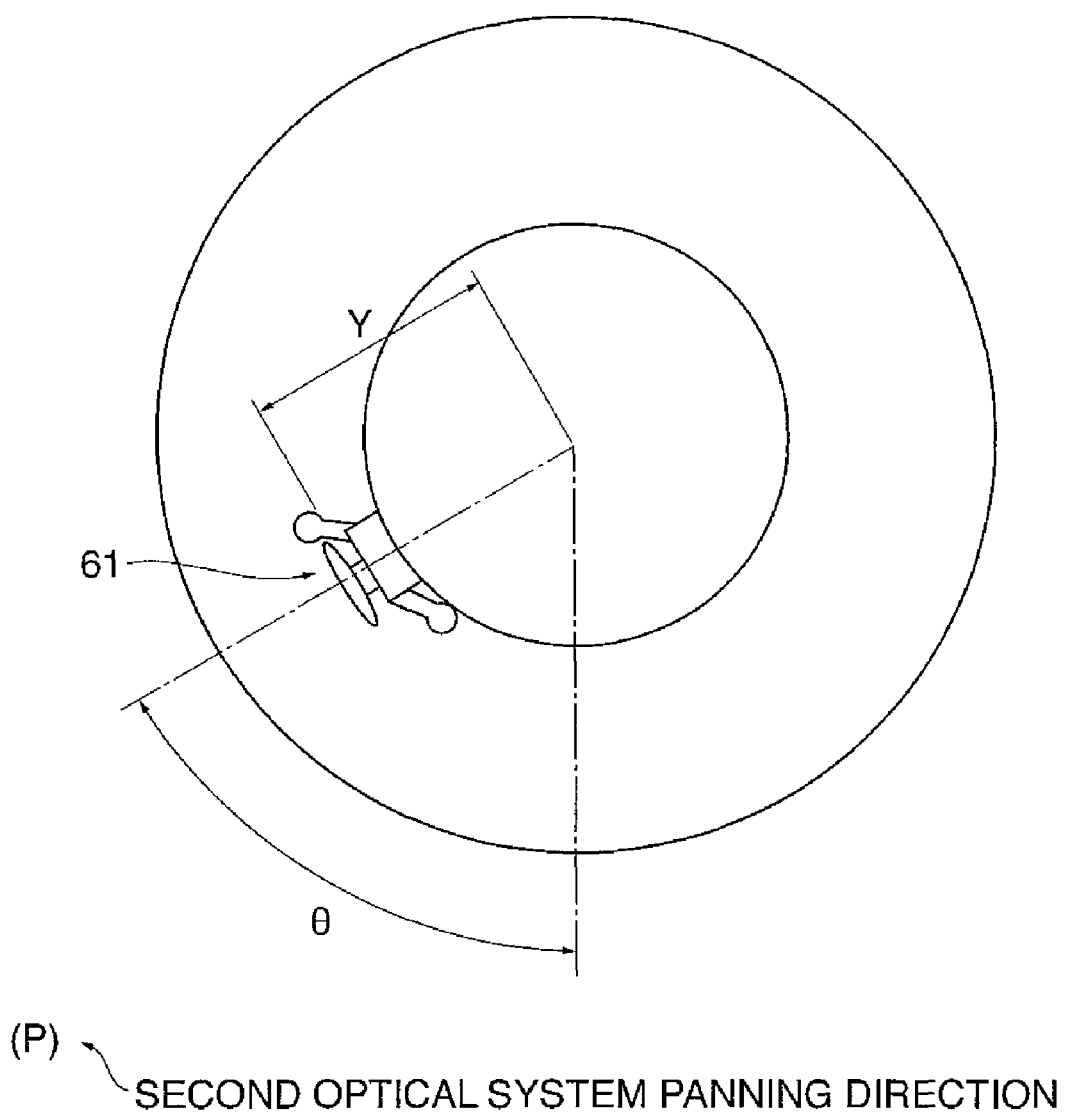
FIG. 6 is a view of an initial image state during subject recognition by the imaging device (optical apparatus) which includes the optical device.

Example applications of the optical device proposed in the present embodiment are described based on FIG. 4 to FIG. 6.

FIG. 4 is a view of an example of the imaging device (optical apparatus) which includes the optical device.

In FIG. 4, an imaging device 41 is installed on a ceiling surface 42 with the imaging element inside the imaging device (not shown in the drawing) pointing downwards so as to enable diagonally downward observation of a subject (person) 43. In FIG. 4, reference numeral 44 indicates an image taken by the first optical system of the optical device, and reference numeral 45 indicates an image taken by the composite optical system composed of the first optical system and the second optical system. Further, the ranges indicated by the arrows are angles of view, and are described later with reference to FIG. 5. Further, ω in the drawings schematically expresses a subject direction angle, and is described later with reference to FIG. 6 to FIG. 11.

FIG. 5 is a view schematically showing a construction of the mechanism of the imaging device (optical apparatus) which includes the optical device.

In FIG. 5, the imaging device 41 includes an optical device and an imaging element in a casing, a panning mechanism 41a for driving in the direction of arrow Ya (panning direction), a tilting mechanism 41b for driving in the direction of arrow Yb (tilting direction), and a protective dome 41c. In FIG. 5, the range indicated by symbol 51 is the angle of view for the first optical system of the optical device, and the range indicated by the symbol 52 is the angle of view of the composite optical system composed of the first optical system and the second optical system of the optical device.

In the imaging device 41, the deflection angle of the reflective member is freely set (tilted) by rotationally driving the reflective member in the second optical system in the optical device. This enables the imaging axis for the second optical system to be adjusted in accordance with distance to the subject. Moreover, with the optical axis as an axis of rotation, the reflective member in the second optical system in the optical device and at least the optical system disposed on the subject side in the second optical system in the optical device are rotationally driven (panned). This enables the imaging direction of the second optical system to be altered in accordance with the direction of the subject.

Note that although FIG. 5 is a view of a construction in which the entire optical system, including the imaging element, is capable of rotating around the optical axis, the present invention is not limited to such an arrangement. Any arrangement is acceptable provided that at least the B1 group, including the reflective member, in the second optical system are rotated around the optical axis of the first optical system.

Further, in FIG. 4, to capture an image of the upper body of a walking subject (person) 43 using the imaging device 41, the subject direction is first recognized from the image taken by the first optical system, and the horizontal direction imaging axis of the second optical system is then panned accordingly. Thereafter, imaging of the upper body of the subject 43 is performed by tilting the imaging axis according to the distance of the subject 43. By repeating these operations, it is possible to accurately track a moving body (the walking subject).

The following describes an example of a method for performing subject direction detection and correction movement. In the optical device, position detection is performed to find the current tilting direction and panning direction settings of the imaging axis of the optical system. Next, a panning rotation angle is calculated for performing correction movement by moving the target subject in a concentric circle direction so that the target subject taken by the first optical system and recognized by the shape recognizing unit or the like (not shown in the drawings) is in the image circle. At the same time, an amount of driving for tilt correction is calculated using the distance from the center of the image circle to the target subject in a radial direction. Then, the panning mechanism and the tilting mechanism are driven according to the results of the calculation.

FIG. 6 is a view of an initial image state during subject recognition by the imaging device (optical apparatus) which includes the optical device.

In FIG. 6, a control unit of the optical device recognizes (detects) the target subject 61, and calculates the amount of driving necessary in the panning direction and tilting direction to capture a detailed image of a target subject 61 using the second optical system. Note that the electrical construction that includes the control unit of the imaging device equipped with the optical device is described later with reference to FIG. 10.

The current panning (horizontal) direction of the second optical system in the optical device is assumed to be the (P) direction shown in the drawings. With the (P) direction as reference, an angle θ for the concentric circle direction of the target subject 61 is judged based on the image captured by the first optical system in the peripheral region of the image circle. Next, a polynomial function with coefficients that reflect a relationship between the angle of light rays incident on the first optical system and an image height formed by the light rays on the image formation plane of the imaging element is coded in a driving algorithm.

Next, a distance (screen image height) Y from the center of the image circle (screen center) to a target subject center is calculated, and a subject direction angle ω is calculated from the distance Y. With this approach, it is possible to obtain the tilt driving angle necessary for a tilt movement group (an optical structure on the subject side including the reflective member) of the second optical system.

The following describes a light path diagram in a second numerical example using the optical device of the present embodiment, based on FIGS. 7A to 7C.

FIGS. 7A to 7C are views of light paths in the first optical system and the second optical system of the optical device of a second numerical example.

In FIGS. 7A to 7C, the optical device is constructed from a first optical system 71 and a second optical system 72. The first optical system 71 includes a front group A, indicated by 71-1, and a back group A, indicated by 71-2. The symbol 73 indicates a filter. The second optical system 72 includes a front group B, indicated by 72-1, and a back group B, indicated by 72-2. The front group B, indicated by 72-1, includes a reflective member 74, a B group 75, a B2 group 76, and a B3 group 77.

With the B group 75 and the reflective member 74 in the front group B, indicated by 72-1, fixed in the second optical system 72, the optical device allows changes in magnification factor by movement of the B2 group 76 and the B3 group 77 along the optical axis. FIG. 7A is a view of the case in which the B2 group 76 and the B3 group 77 are at the telephoto end side for telephoto image capture. FIG. 7B is a view of the case in which the B2 group 76 and the B3 group 77 are positioned between the telephoto end and the wide angle end. FIG. 7C is a view of the case in which the B2 group 76 and the B3 group 77 are at the wide-angle end for wide-angle image capture.

The deflection angle is set to an acute angle (where the light axis direction is 0° when not inclined) so that the subject image taken by the second optical system 72 overlaps, as far as possible, the subject image taken within an effective angle of view by the first optical system 71.

The first optical system 71 includes a lens member 78 which has a positive refractive index and only permits transmission of light rays that have passed through the second optical system 72. With this arrangement, the refractive power of the front group A, indicated by 71-1 and disposed in the first optical system 71, can be changed to be positive for the light rays passing through the lens member 78. Hence, it is no longer necessary to give the back lens group B, indicated by 72-2 and disposed on the subject side of the second optical system 72, a strongly positive refractive power. As a result, it is possible to prevent deterioration in optical performance and to shorten the optical system by reducing the number of lenses in the back group B, indicated by 72-2.

The following describes light path diagrams in a third numerical example using the optical device of the present embodiment, based on FIGS. 8A to 8C and FIGS. 9A to 9C.

FIGS. 8A to 8C are views of light paths in the first optical system and the second optical system of the optical device in a third numerical example when the deflection angle of the second optical system is 60°.

In FIGS. 8A to 8C, the optical device is constructed from a first optical system 81 and a second optical system 82. The first optical system 81 includes a front group A, indicated by 81-1, and a back group A, indicated by 81-2. The symbol 83 indicates a filter. The second optical system 82 includes a front group B, indicated by 82-1, and a back group B, indicated by 82-2. The front group B, indicated by 82-1, includes the reflective member (reflective mirror) 84, a B1 group 85, a B2 group 86, and a B3 group 87.

With the reflective member 84 disposed in the B1 group 85 in the second optical system 82 as a reflecting mirror, the inclination direction of the optical axis is changed by rotationally driving the reflective member 84. At the same time, the lenses of the B1 group 85 are rotationally driven so as to align with the optical axis on the subject side of the reflective member 84 whose incident optical axis is being inclined. In this example, the deflection angle can be changed freely in the range of 60° to 110° by rotationally driving the reflective member 84 and the lenses of the B1 group 85.

FIGS. 9A to 9C are views of light paths in the first optical system and the second optical system of the optical device in a third numerical example, and show an example for when the deflection angle of the second optical system is 110°.

FIGS. 9A to 9C show that the optical device of the present embodiment is not limited to performing tracking operations of a moving body, but further allows simultaneous observation of subject body in a different direction.

Figure 10:
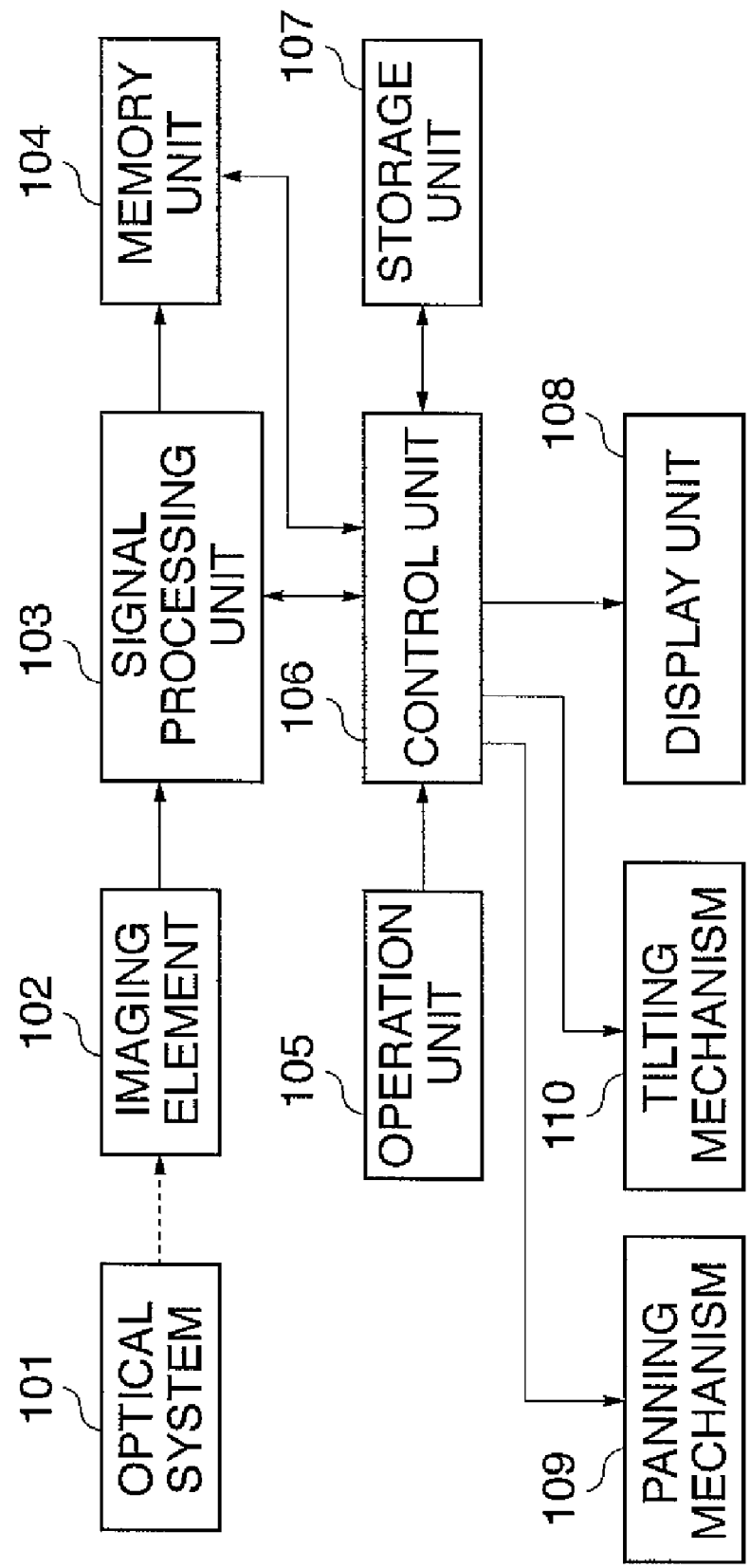
FIG. 10 is a block diagram showing an example electrical construction of the imaging device (optical apparatus) which includes the optical device.
Figure 11:
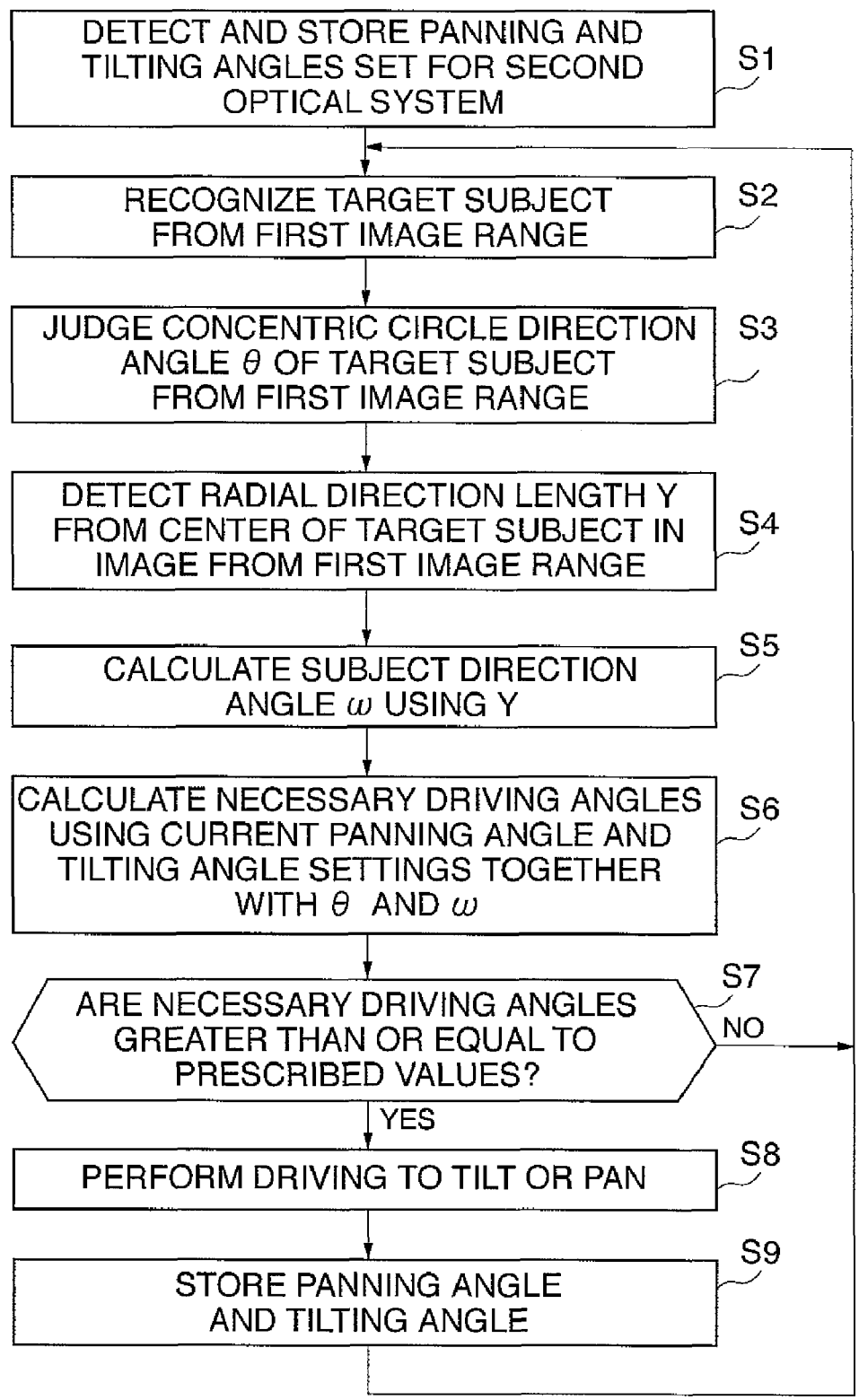
FIG. 11 is a flowchart showing tracking operations for a moving body after subject recognition by the imaging device (optical apparatus) including the optical device.
Figures 12A, 12B, 12C, 12D:
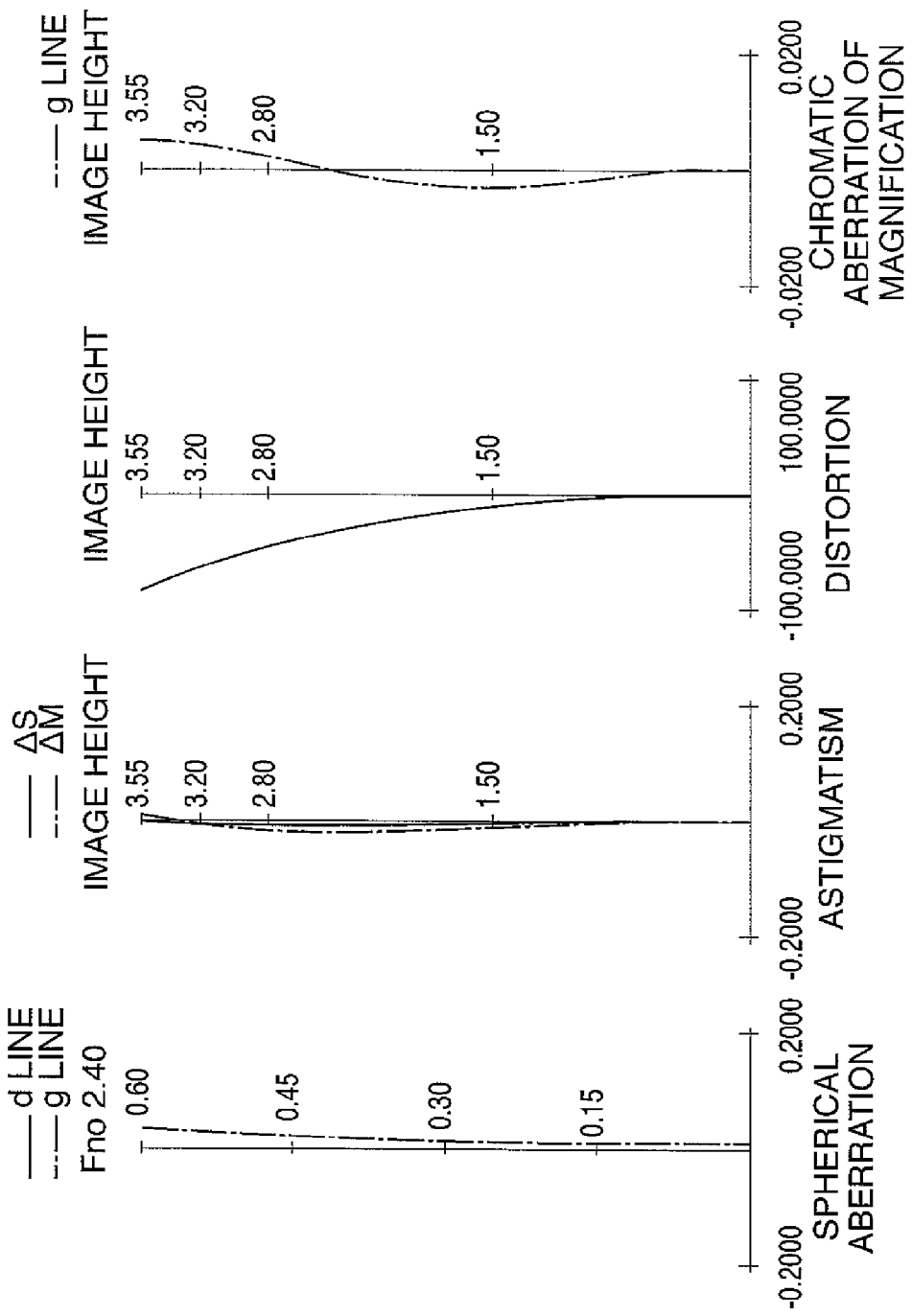
FIGS. 12A to 12D are views of aberrations in the first optical system and the second optical system of the optical device in the first numerical example and the second numerical example.
Figures 16A, 16B, 16C, 16D:
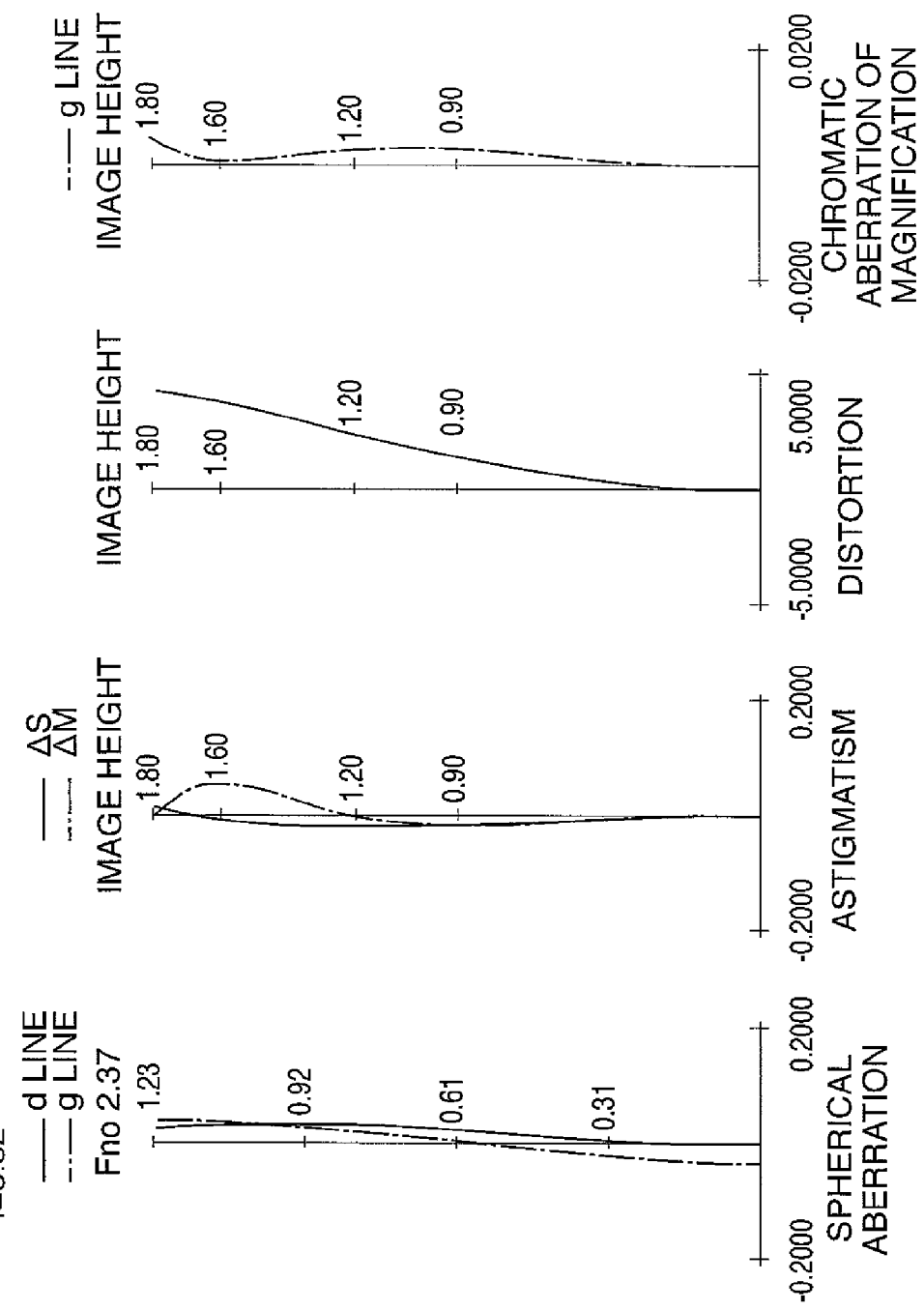
FIGS. 16A to 16D are views of aberrations at a telephoto end in the composite optical system composed of the first optical system and the second optical system of the optical device in the third numerical example.
Figures 17A, 17B, 17C, 17D:
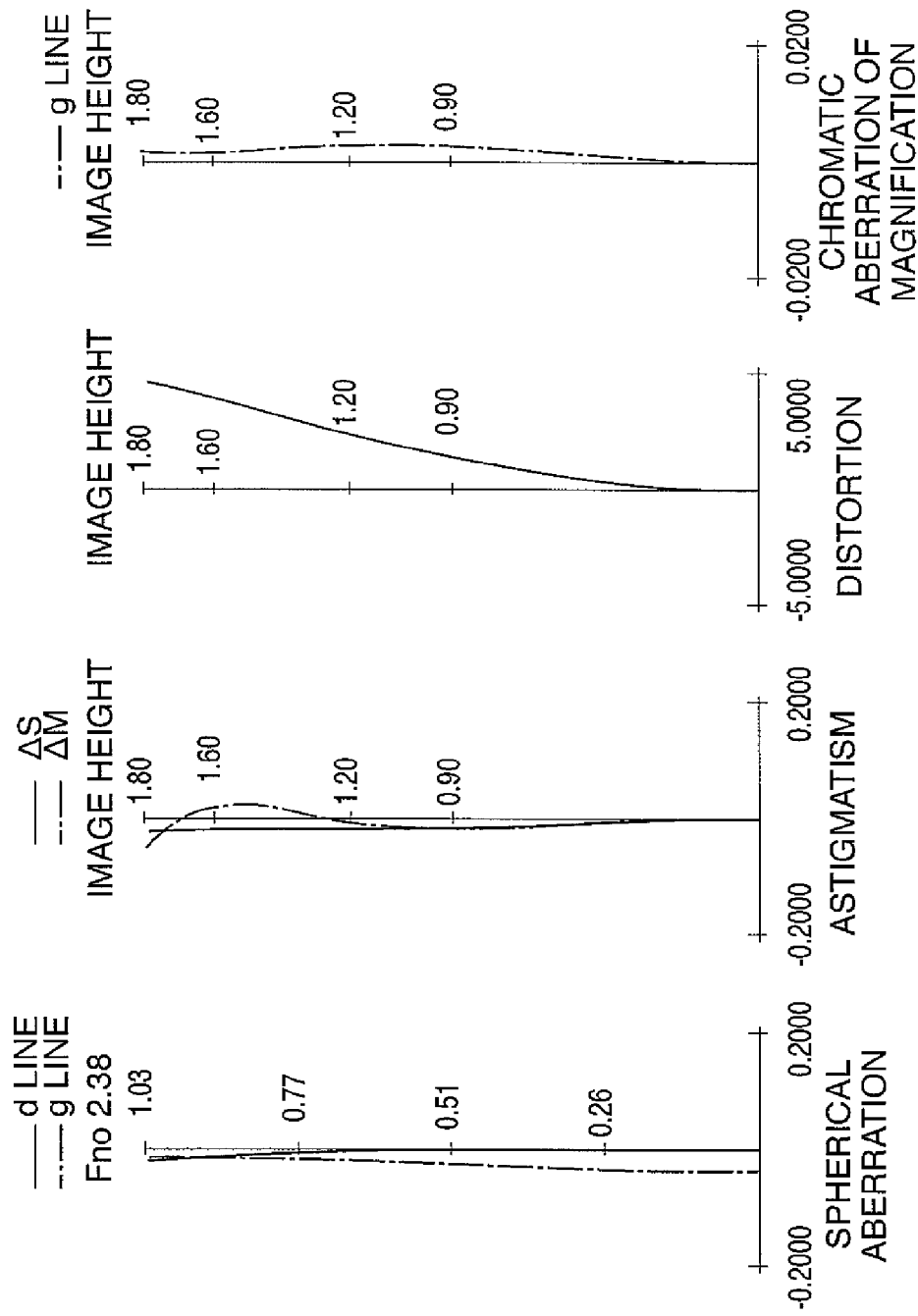
FIGS. 17A to 17D are views of aberrations at an intermediate position in the composite optical system composed of the first optical system and the second optical system of the optical device in the third numerical example.

The following describes an example electrical construction of the imaging device (optical apparatus) which includes the optical device of the present embodiment, and a control example, based on FIG. 10 and FIG. 11.

FIG. 10 is a block diagram showing the electrical construction of the imaging device (optical apparatus) which includes the optical device.

The imaging device in FIG. 10 includes an optical device having an optical system 101, an imaging element 102, a signal processing unit 103, a memory unit 104, an operation unit 105, a control unit 106, a storage unit 107, a display unit 108, a panning mechanism 109, and a tilting mechanism 110. The imaging element 102 photo-electronically converts a subject image formed by the optical system 101 into electronic signals. The signal processing unit 103 executes signal processing on the electronic signals outputted from the imaging element 102, and stores the result as image data in the memory unit 104. Besides a memory region for the image data, the memory unit 104 includes an operations region and a temporary data storage region for use by the control unit 106. The operation unit 105 is used for inputting various types of instruction to the optical device.

As well as controlling the entire imaging device including the optical device, the control unit 106 controls the driving of the panning mechanism 109 and the tilting mechanism 110. The panning mechanism 109 performs panning operations based on the control of the control unit 106. The tilting mechanism 110 performs tilting operations based on the control of the control unit 106. The control unit 106 executes the processing shown in the flowchart of FIG. 11 based on a control program stored in the storage unit 107. The display unit 108 displays the captured image, and can be provided in a position away from the body of the imaging device (for instance, in a monitoring center when the imaging device is to be used for monitoring).

FIG. 11 is a flowchart showing the flow of moving-body tracking operations after subject recognition by the imaging device (optical apparatus) including the optical device.

As shown in FIG. 11, the control unit 106 of the imaging device detects a panning angle (angle for driving the panning direction) and a tilting angle (angle for driving the tilting direction) as specified via the operation unit 105 for the second optical system of the optical device, and stores the detected panning angle and tilting angle in the memory unit 104 (step S1). Next, the control unit 106 recognizes the target subject from a first image range (the peripheral region of the image circle in FIG. 6) provided by the first optical system of the optical device (step S2), and judges the angle θ (FIG. 6) for the concentric circle direction of the target subject from the first image range (step S3).

Next, the control unit 106 detects, from the first image range, the length Y (FIG. 6) in the radial direction from the center of the target subject image (step S4), and detects the subject direction angle ω based on the length Y (step S5). Next, the control unit 106 calculates necessary driving angles from the current settings of the panning angle and tilting angle, the angle θ for the concentric circle direction of the target subject, and the subject direction angle ω (step S6), and judges whether the necessary driving angles are greater than or equal to prescribed values which have been set previously (step S7). The necessary driving angles are the panning direction and tilting direction driving angles necessary for tracking the target subject (moving body).

When the calculated necessary driving angles are less than the prescribed values set in advance, the flow returns to the step S2. On the other hand, when the calculated necessary driving angles are greater than or equal to the prescribed values set in advance, the control unit 106 performs driving in the panning direction using the panning mechanism 109 and driving in the tilting direction using the tilting mechanism 110 (step S8). Thereafter, the control unit 106 stores the panning angle associated with the driving in the panning direction and the tilting angle associated with the driving in the tilting direction in the memory unit 104 (step S9), and followed by the flow returning to the step S2.

Aberration diagrams for the optical devices in the first to third numerical examples are shown in FIGS. 12A to 19D.

FIGS. 12A to 12D are views of aberrations in the first optical system of the optical device in the first numerical example and the second numerical example.

FIGS. 13A to 13D are views of aberrations in the composite optical system composed of the first optical system and the second optical system of the optical device in the first numerical example.

FIGS. 14A to 14D are views of aberrations in the composite optical system composed of the first optical system and the second optical system of the optical device in the second numerical example.

FIGS. 15A to 15D are views of aberrations in the first optical system of the optical device in the third numerical example.

FIGS. 16A to 16D are views of aberrations at the telephoto end in the composite optical system composed of the first optical system and the second optical system of the optical device in the third numerical example.

FIGS. 17A to 17D are views of aberrations at an intermediate position in the composite optical system composed of the first optical system and the second optical system of the optical device in the third numerical example.

FIGS. 18A to 18D are views of aberrations at the wide-angle end of the composite optical system composed of the first optical system and the second optical system of the optical device in the third numerical example.

In FIGS. 12 to 18D, FIGS. 12A to 18A each show spherical aberration, FIGS. 12B to 18B each show astigmatism, FIGS. 12C to 18C each show distortion, and FIGS. 12D to 18D each show chromatic aberration of magnification. ΔS indicates the sagittal image surface and ΔM indicates the meridional image surface.

The following indicates specific values for the first to third numerical examples.
(1) Specific values for the first numerical example are shown below in FIG. 19A to FIG. 19D.
(2) Specific values for the second numerical example are shown below in FIG. 20A to FIG. 20C.
(3) Specific values for the third numerical example are shown below in FIG. 21A to FIG. 21D.

In the first to third numerical examples described above, Ri indicates the lens thickness and air separation of an i-th lens from the subject side. Ni and vi are, respectively, the refractive index and Abbe number of the glass for constructing the i-th lens from the subject side.

Further, the aspherical coefficients K, A, B, C, D, and E in the first to third numerical examples are given by the following formula.

$$X=(H2/R)/(1+(1-(1+K)\cdot(H/R)2)^{1/2}+A\cdot H2+B\cdot H4+C\cdot H6+D\cdot H8+E\cdot H10)$$

Here, X is an amount of displacement from the lens apex in the optical axis direction, H is a distance from the optical axis, and R is a radius of curvature.

Further, in the first to third numerical examples, the values following "e" in the aspherical coefficient values are powers of 10.

As described above, according to the present invention, the optical device has the following construction. The second optical system which forms another image inside the range of the image formed by the first optical system is disposed on the subject side of the first optical system which is a refracting optical system having a wide-angle lens or fish-eye lens function and an angle of view of at least 90°.

This construction makes it possible to realize an optical device, of reduced size and cost, that simultaneously captures wide-angle images taken by the first optical system and images taken by a composite optical system composed of the first optical system and the second optical system. Thus, without using special optical parts, it is possible to realize an optical device of small size and with a simple construction for simultaneously forming a wide-angle subject image and a separate detailed subject image on a single imaging element.

In the above-described embodiment, the second optical system was described as having a reflective member. A reflecting mirror or a reflecting prism may be used as the reflective member, provided the selected component functions to incline the optical axis.

In the above embodiment, an example was described in which the imaging device including the optical device was installed in the ceiling. However, the imaging device including the optical device may be freely used, without limits on the field of use.

In the above embodiment, specific values were indicated in the first to third numerical examples. However, the values recorded in the first to third numerical examples are simply examples, and do not limit the scope of the present invention.

It is to be understood that the object of the present invention may be also be accomplished by supplying a system or an apparatus with a storage medium in which a program code of software which realizes the functions of the above-described embodiment is stored, and causing a computer (or CPU, MPU or the like) of the system or apparatus to read out and execute the program code stored in the storage medium.

In this case, the functions of the above-described embodiment are realized by the program code itself, read from the storage medium, and the storage medium with the program code stored thereon is understood to constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above-described embodiment may be accomplished not only by executing program read out by a computer, but also by causing an operating system which operates on the computer to form a part or all of the actual operations based on instructions of the program code.

Further, it is to be understood that the functions of the above-described embodiment may be accomplished by writing a program code read out from the storage medium into a memory provided on an expansion board inserted in a computer or in an expansion unit connected to the computer and then causing a CPU or the like provided in the expansion board or in the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-316117 filed Nov. 22, 2006, which is hereby incorporated by reference herein in its entirety.

What is claimed is:

1. An optical device for use in imaging, comprising:
    a first optical system adapted to form a first image; and
    a second optical system, different from the first optical system, disposed on a subject side of a light ray path extending from a subject, through said second optical system, and to enter said first optical system from said second optical system, and adapted to form a second image within the first image formed by said first optical system;
    wherein the first optical system comprises a wide angle lens, and the second optical system comprises a narrow angle lens.

2. An optical device according to claim 1, wherein said first optical system includes an optical member having an outer diameter that is larger than an outer diameter of an optical member of said second optical system, and having a refractive function for forming the first image outside the second image formed by said second optical system.

3. An optical device according to claim 1, wherein said first optical system includes an optical member being arranged on an optical axis of said second optical system, and having a refractive function for forming the first image outside the second image formed by said second optical system.

4. An optical device according to claim 1, wherein said first optical system has an angle of view of at least 90° and functions as a wide-angle lens or a fish-eye lens.

5. An optical device according to claim 1, wherein said second optical system does not entirely block light rays incident on said first optical system.

6. An optical device according to claim 1, wherein said second optical system has an outer lens diameter which allows transmission of at least a portion of off-axis light rays.

7. An optical device according to claim 1, wherein said second optical system includes a reflective member for deflecting light rays incident on said second optical system toward said first optical system.

8. An optical device according to claim 7, wherein the reflective member is adapted to rotate around an optical axis of said first optical system.

9. An optical device according to claim 7, wherein the reflective member is adapted to rotate around an optical axis of said first optical system, together with an optical system disposed on a subject side in the second optical system.

10. An optical device according to claim 1, wherein said second optical system is adapted to perform an primary image formation on the subject side of said first optical system, and said first optical system is adapted to perform a secondary image formation to the first image formation.

11. An optical device according to claim 10, wherein a positive lens group of said second optical system is disposed on an image plane side of a position where the primary image formation is performed, and said first optical system is disposed on the image plane side of the positive lens group.

12. An optical device according to claim 1, wherein said first optical system includes an optical member adapted to transmit only light rays passing through said second optical system.

13. An imaging device including the optical device of claim 1, comprising:
an imaging unit adapted to photo-electronically convert a subject image formed by the optical device to electronic signals;
a panning mechanism adapted to drive the optical device in a panning direction; and
a tilting mechanism adapted to drive the optical device in a tilting direction.

14. A control method for an optical device including a first optical system adapted to form a first image; and a second optical system, different from the first optical system, disposed on a subject side of a light ray path extending from a subject, through said second optical system, and to enter the first optical system from said second optical system, and adapted to form a second image within the first image formed by the first optical system, wherein the first optical system comprises a wide angle lens, and the second optical system comprises a narrow angle lens, the optical device being adapted to be driven in a panning direction and a tilting direction, the control method comprising:
a detecting step of recognizing a target subject from an image formed by the first optical system, and detecting a relative position of the target subject with respect to the optical device;
a calculating step of calculating necessary driving angles in the panning direction and the tilting direction of the optical device based on the detected relative position of the target subject with respect to the optical device; and
a driving step of driving the optical device in the panning direction and tilting direction when the calculated necessary driving angles are greater than or equal to prescribed values.

15. A non-transitory computer-readable storage medium storing a program for causing a computer to execute a control method for an optical device including a first optical system adapted to form a first image; and a second optical system, different from the first optical system, disposed on a subject side of a light ray path extending from a subject, through said second optical system, and to enter the first optical system from said second optical system, and adapted to form a second image within the first image formed by the first optical system, wherein the first optical system comprises a wide angle lens, and the second optical system comprises a narrow angle lens, the optical device being adapted to be driven in a panning direction and a tilting direction, the control method comprising:
a detecting step of recognizing a target subject from an image formed by the first optical system, and detecting a relative position of the target subject with respect to the optical device;
a calculating step of calculating necessary driving angles in the panning direction and the tilting direction of the optical device based on the detected relative position of the target subject with respect to the optical device; and
a driving step of driving the optical device in the panning direction and tilting direction when the calculated necessary driving angles are greater than or equal to prescribed values.

* * * * *